US009506554B2

(12) United States Patent
Sone et al.

(10) Patent No.: US 9,506,554 B2
(45) Date of Patent: Nov. 29, 2016

(54) ROLLING BEARING AND A TRAVEL UNIT INCLUDING ROLLING BEARINGS

(75) Inventors: Katsunori Sone, Kuwana (JP); Naota Yamamoto, Kuwana (JP); Hiroyoshi Ito, Kuwana (JP); Kiyoshige Yamauchi, Kuwana (JP); Hiroyuki Miyazaki, Kuwana (JP); Takashi Ito, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/005,833

(22) PCT Filed: Mar. 22, 2012

(86) PCT No.: PCT/JP2012/057326
§ 371 (c)(1),
(2), (4) Date: Sep. 18, 2013

(87) PCT Pub. No.: WO2012/128316
PCT Pub. Date: Sep. 27, 2012

(65) Prior Publication Data
US 2014/0011622 A1   Jan. 9, 2014

(30) Foreign Application Priority Data

Mar. 22, 2011 (JP) ................................. 2011-062445
Mar. 24, 2011 (JP) ................................. 2011-065524
Mar. 22, 2012 (JP) ................................. 2012-064675
Mar. 22, 2012 (JP) ................................. 2012-064678

(51) Int. Cl.
*F16C 33/76*   (2006.01)
*F16C 19/54*   (2006.01)
(Continued)

(52) U.S. Cl.
CPC .............. *F16H 57/08* (2013.01); *F16C 19/364* (2013.01); *F16C 19/543* (2013.01);
(Continued)

(58) Field of Classification Search
CPC .............. F16C 33/6659; F16C 33/667; F16C 33/7816; F16C 33/782; F16C 33/7823; F16C 33/7826; F16C 33/7853; F16C 33/7889; F16C 33/6622; F16C 19/364; F16C 19/543; F16C 33/7813; F16C 33/783; F16C 2326/02; F16C 2361/61; F16H 57/041; F16H 57/04; F16H 57/08; F16H 1/46; F16H 57/0486
USPC ....... 384/462, 469, 471, 473–475, 477, 484; 277/349, 370, 402, 918
See application file for complete search history.

(56) References Cited

U.S. PATENT DOCUMENTS 4,846,592 A      7/1989   Tsumori et al.
5,456,475 A  *  10/1995  Abraham et al. ............. 210/171
(Continued)

FOREIGN PATENT DOCUMENTS

DE          2029429 A1  *  1/1971
DE         19634689 A1  *  3/1998
(Continued)

OTHER PUBLICATIONS

Machine translation of JP 8-303473 obtained on Mar. 25, 2015.*
(Continued)

*Primary Examiner* — Adam D Rogers
(74) *Attorney, Agent, or Firm* — Wenderoth, Lind & Ponack, L.L.P.

(57) ABSTRACT

A rolling bearing includes rolling elements incorporated between an outer race and an inner race, a resin seal ring covering the opening of at least one end of the bearing space, and a filter covering an oil hole formed in the seal ring for capturing foreign matter contained in lubricating oil. The filter and the resin seal ring are integrated by insert molding. The filter and the seal ring are made of the same material. An annular lip portion, which is separate from the seal ring, is in contact with the outer race. An engaged portion provided on the radially inner side of the seal ring is engaged in a recess formed in the inner race such that, during thermal expansion of the seal ring, the engaged portion is engaged such that the seal ring is movable in the radial direction relative to the inner race.

7 Claims, 13 Drawing Sheets

(51) Int. Cl.
  *F16C 19/00* (2006.01)
  *F16H 57/08* (2006.01)
  *F16C 19/36* (2006.01)
  *F16C 33/66* (2006.01)
  *F16C 33/78* (2006.01)
  *F16H 57/04* (2010.01)
  *F16H 1/46* (2006.01)

(52) U.S. Cl.
  CPC .......... *F16C 33/667* (2013.01); *F16C 33/783* (2013.01); *F16C 33/7813* (2013.01); *F16C 33/7889* (2013.01); *F16H 57/04* (2013.01); *F16C 2326/02* (2013.01); *F16C 2361/61* (2013.01); *F16H 1/46* (2013.01); *F16H 57/0486* (2013.01)

(56) References Cited

U.S. PATENT DOCUMENTS

| | | | |
|---|---|---|---|
| 5,492,416 | A | 2/1996 | Gabelli et al. |
| 5,513,918 | A * | 5/1996 | Wan .............................. 384/477 |
| 7,832,735 | B2 * | 11/2010 | Paykin ........................... 277/568 |
| 2004/0065169 | A1 | 4/2004 | Ciszak et al. |
| 2009/0215569 | A1 | 8/2009 | Shibukawa et al. |
| 2010/0191417 | A1 | 7/2010 | Murahashi et al. |
| 2015/0167743 | A1 * | 6/2015 | Yamauchi et al. ............ 384/484 |

FOREIGN PATENT DOCUMENTS

| | | |
|---|---|---|
| DE | 19958788 A1 * | 6/2001 |
| DE | 202010017137 U1 * | 1/2012 |
| JP | 43-24167 | 10/1968 |
| JP | 46-9083 | 3/1971 |
| JP | 47-13802 | 4/1972 |
| JP | 63-170615 | 11/1988 |
| JP | 5-79048 | 10/1993 |
| JP | 06-323335 | 11/1994 |
| JP | 08-303473 | 11/1996 |
| JP | 09-196066 | 7/1997 |
| JP | 2000-055064 | 2/2000 |
| JP | 2002-227974 | 8/2002 |
| JP | 2002-250354 | 9/2002 |
| JP | 2006-010478 | 1/2006 |
| JP | 2006-322538 | 11/2006 |
| JP | 2009-204016 | 9/2009 |
| JP | 2010-174950 | 8/2010 |
| WO | WO 2006123795 A1 * | 11/2006 |
| WO | WO 2011138107 A1 * | 11/2011 |
| WO | WO 2014103694 A1 * | 7/2014 |

OTHER PUBLICATIONS

Machine translation of JP 2002-227974 A obtained on Mar. 30, 2015.*
Translation of JP 43-024167 U obtained on Mar. 30, 2015.*
International Search Report issued Jun. 26, 2012 in International (PCT) Application No. PCT/JP2012/057326.
Written Opinion of the International Searching Authority issued Jun. 26, 2012 in International (PCT) Application No. PCT/JP2012/057326 (with English translation).
Japanese Office Action issued Oct. 20, 2015 in Japanese Application No. 2012-065064 (with English translation).
Japanese Office Action issued Sep. 29, 2015 in Japanese Application No. 2012-064675 (with partial English translation).

* cited by examiner

Fig. 1
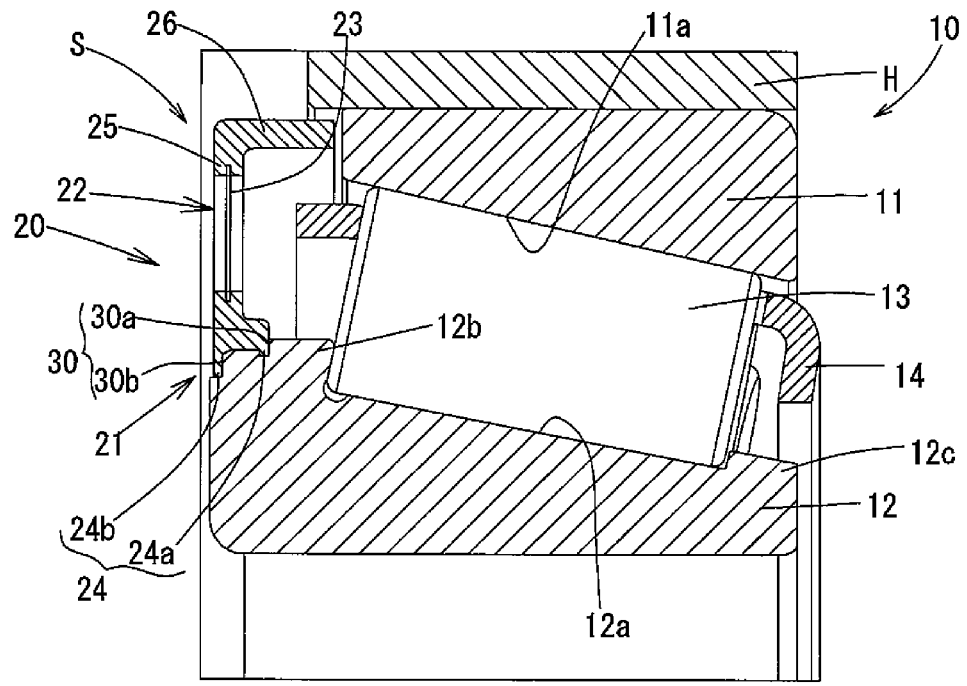
Fig. 2(a)          Fig. 2(b)
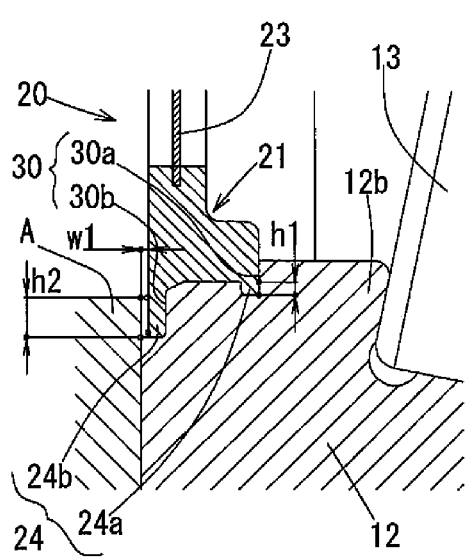    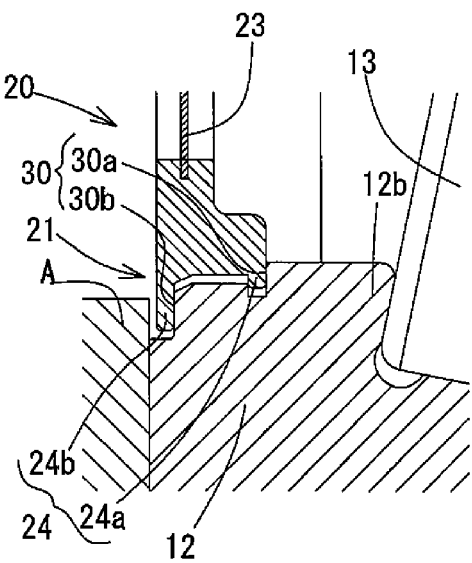

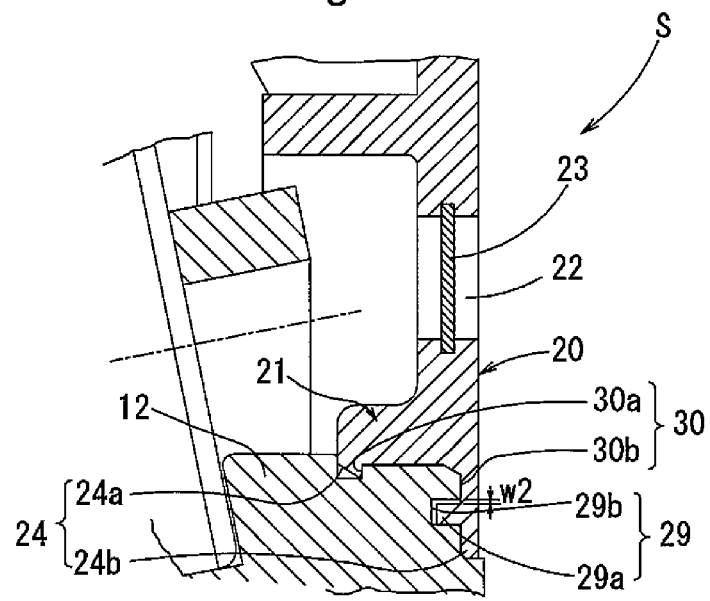
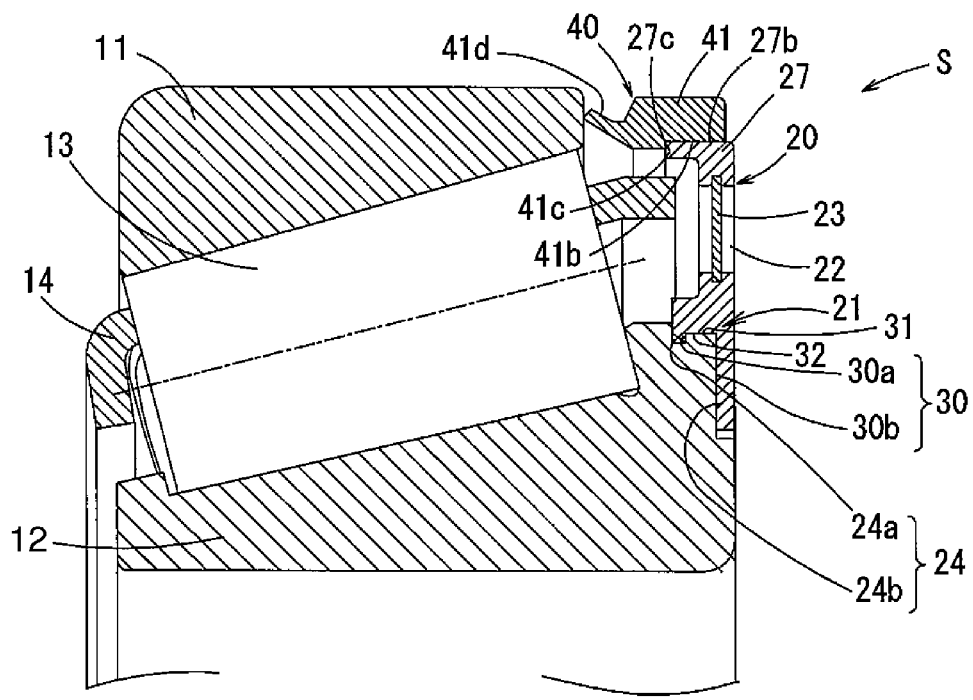

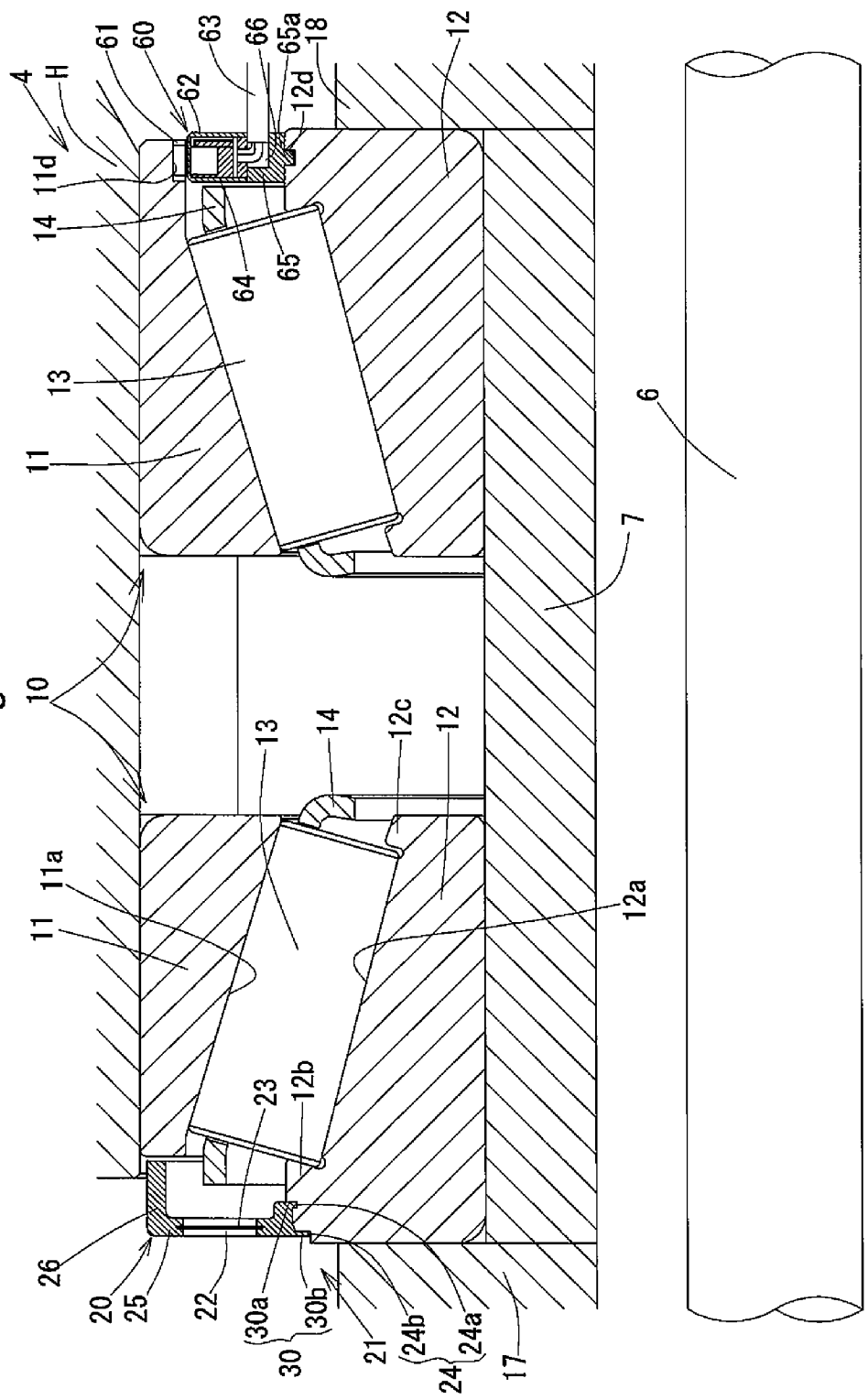

ROLLING BEARING AND A TRAVEL UNIT INCLUDING ROLLING BEARINGS

TECHNICAL FIELD

This invention relates to a rolling bearing lubricated with oil that flows into the bearing through a filter, and to a travel unit including oil-lubricated rolling bearings in addition to power transmission mechanisms including a transmission and a speed reducer.

BACKGROUND ART

Rolling bearings are mounted in power transmission mechanisms of motor vehicles, construction machines, etc, such as transmissions, differentials and speed reducers, as well as in travel units thereof, which include the above-mentioned power transmission mechanisms.

Rolling bearings used in some of these travel units are lubricated by the same oil used to lubricate the entire power transmission mechanism.

Oil stored in the cases of power transmission mechanisms such as transmissions, differentials and speed reducers contains foreign matter such as wear dust (including iron dust) originating from gears in relatively large amounts. Foreign matter that enters the interior of a rolling bearing could get wedged between moving parts of the bearing, causing flaking of raceways and rolling surfaces, which in turn reduces the durability of the rolling bearing.

In order to prevent entry of foreign matter, a rolling bearing is proposed including a filter attached to a seal ring mounted to the rolling bearing. This seal ring carries filters which cover oil flow passages formed in the seal ring and adapted to capture foreign matter contained in oil (see e.g. JP Patent Publication 6-323335A and JP Patent Publication 2002-250354A).

Travel units of some of motor vehicles, construction machines, etc. include, in addition to power transmission mechanisms such as a transmission and a speed reducer, oil-lubricated rolling bearings.

Such travel units include a travel unit 4 used in a dump truck 1 used in mines (construction machine), as shown in FIG. 16. This dump truck 1 includes a chassis 2 supporting a load deck and a driver's cab, and supported by a plurality of drive wheels (tires) 3. The dump truck further includes travel units 4 for driving the respective drive wheels 3.

As shown in FIG. 15, each travel unit 4 includes a driving source or a travel motor 5, and a shaft 6 connected to the rotary shaft of the motor 5. A power transmission mechanism T or a speed reducer is mounted around the distal end portion of the shaft 6.

A stationary axle or a spindle 7 is provided around the shaft 6. The body 9 of each drive wheel 3 is mounted around the spindle 7 through rolling bearings 10. The rotation of the wheel body 9 is transmitted to the tire of the drive wheel 3 through a rim 8.

The speed reducer can be any of many known types according to how the motor vehicle or construction machine is used. The speed reducer of the travel unit 4 shown in FIG. 15 is a planetary gear mechanism 50 including a first planetary gear unit 50a and a second planetary gear unit 50b. The rotation of the shaft 6 is reduced by the two planetary gear units 50a and 50b and transmitted to the wheel body 9.

The first planetary gear unit 50a includes a first sun gear 51 which rotates together with the shaft 6, a plurality of first planetary gears 52 meshing with the first sun gear 51, and an outer ring gear 53 meshing with the first planetary gears 52.

A coupling member 53a rotatable about the shaft 6 is connected to the outer ring gear 53.

The second planetary gear unit 50b includes a second sun gear 54 which rotates about the shaft 6 together with the coupling member 53a, and second planetary gears 55 meshing with the second sun gear 54. The second planetary gears 55 are rotatable about respective support shafts 56b of a planetary carrier 56 and mesh with an outer ring gear 59a which rotates together with the wheel body 9. The planetary carrier 56 has an extension 56a fixedly splined to an inner peripheral portion 7a of the spindle 7. A bearing presser member (retainer) 17 is disposed between the end surfaces of the planetary carrier 56 and the spindle 7, keeping the end surfaces spaced apart from each other.

When the shaft 6 is rotated about its axis by the travel motor 5, the first sun gear 51 is rotated about its axis by the shaft 6. The first planetary gears 52 are thus rotated by the first sun gear 51 within the outer ring gear 53. When the first planetary gears 52 are rotated, the coupling member 53a is rotated together with first planetary gears 52, so that the second sun gear 54, which meshes with the coupling member 53a, rotates about its axis.

When the second sun gear 54 rotates, the second planetary gears 55 rotate about the respective support shafts 56b of the planetary carrier 56, thus rotating the wheel body 9 through the outer ring gear 59a, which meshes with the second planetary gears 55. The rotation of the wheel body 9 is transmitted to the drive wheel 3 through the rim 8, moving the dump truck 1, used in mines (see e.g. JP Patent Publication 2009-204016A and US Patent Publication 2004/0065169).

The roller bearings 10 used in this travel unit 4 between the spindle 7 and the wheel body 9 are two single row tapered roller bearings. Tapered roller bearings are frequently used as the rolling bearings 10 because rolling bearings used in construction machines have to withstand large radial loads.

A tapered roller bearing includes tapered rollers as rolling elements 13, and inner and outer races 12 and 11 having raceways 12a and 11a and arranged such that the distance between the raceways 11a and 12a gradually decreases in one axial direction. (In the case of each of the bearings 10 of FIG. 15, this direction is the direction toward the other bearing 10.) The inner race 12 of each of the bearings 10 is pressed in the above one axial direction relative to the outer race 11, thereby applying a preload to the respective rolling elements 13. In particular, the preload is applied by pressing the bearing presser member 17 against the spindle 7 by tightening bolts 17a, thereby applying axial compressive force to the inner races 12 of the respective bearings 10 by the bearing presser member 17 and another opposite bearing presser member 18, respectively.

The travel unit 4 may include a rotation sensor or sensors provided on one axial side of the rolling bearings 10 for detecting e.g. the rotational direction, rotational speed, rotational angle, rotational acceleration, etc. so as to use the output signals from the sensor or sensors to control rotation of the rotary shaft of e.g. the motor.

SUMMARY OF THE INVENTION

Object of the Invention

The rolling bearing disclosed in either of JP Patent Publication 6-323335A and JP Patent Publication 2002-250354A includes a seal ring made of an elastomer (seal rings made of an elastomer are hereinafter referred to as "elastic seal members") formed with oil passage hole covered with filters.

Such an elastic seal member has no metal core and is exposed at an opening of the bearing, i.e. at a seal fitting portion. Thus, if an external force is applied to the elastic seal member while e.g. assembling or transporting the bearing, or while mounting the bearing on a machine, the elastic seal member may be deformed or displaced from the expected mounting position, which could deteriorate sealability.

In order to prevent deterioration in sealability and to prolong the lifespan of the seal ring, it is necessary to control the interference between the elastic seal member and the bearing with high accuracy.

Since the elastic seal member is directly mounted on the bearing, in order to increase the accuracy of interference, it is necessary to control the various dimensions of the elastic seal member and the bearing with high accuracy, which increases the manufacturing cost of the bearing. Moreover, it is impossible to improve the dimensional accuracy of the elastic seal member beyond a certain point because the elastic seal member is formed by molding.

If the interference is increased for higher sealability, this results in increased torque of the bearing. If bearings which are different in size (especially bearings having different radial dimensions between the inner and outer races) are used, it is necessary to prepare different seal members for the respective bearings, which also increases the manufacturing cost.

In either of the rolling bearings disclosed in JP Patent Publication 6-323335A and JP Patent Publication 2002-250354A, the filters are presumably fixed to the oil flow holes of the seal ring, which is made of resin or rubber, by means of an adhesive or by fitting the filters in the respective oil flow holes. This presumption is made because it is difficult to form fine mesh members constituting the filters from e.g. a resin simultaneously when forming by molding the relatively thick seal ring in the same mold.

Thus, when the seal ring is thermally deformed, such thermal deformation could partially break connection between a filter and the seal ring, or could cause complete separation of a filter or two from the seal ring.

If a filter separates from the seal ring, it is necessary to replace the seal ring with a new one in order to prevent entry of foreign matter into the rolling bearing. In order to replace the seal ring with a new one, it is necessary to disassemble at least the power transmission mechanism, which is not easy. Thus, it is desired that the filters be mounted in such a manner that they are least likely to separate from the seal ring.

One way to rigidly fix the filters to the seal ring would be to fix the filters prepared beforehand to the seal ring by insert molding. By fixing the filters to the seal ring by insert molding, the peripheral edges of the filters are buried in and retained by the resin or rubber forming the seal ring. The filters are thus less likely to separate from the seal ring.

But even if the filters are fixed to the seal ring by insert molding, if the seal ring is thermally expanded to a greater degree, the filters may not be expanded following the thermal expansion of the seal ring, causing breakage of the mesh, formation of holes, or other damage to the filters. Damage to any filter allows entry of foreign matter into the bearing through the damaged filter. This results in the seal ring losing its function of capturing foreign matter.

Also, if the seal ring is thermally expanded to a greater degree, the seal ring may be expanded radially outwardly until the seal ring completely separates from the inner race. In such a situation too, the seal ring loses its function of capturing foreign matter because foreign matter can enter the bearing through a gap between the seal ring and the inner race.

In this travel unit 4, oil used to lubricate a power transmission mechanism T such as a transmission or a speed reducer flows into the rolling bearings 10. That is, oil used to lubricate the power transmission mechanism T is also used to lubricate the rolling bearings 10.

Generally speaking, oil used to lubricate a power transmission mechanism T such as a transmission or a speed reducer contains a larger amount of foreign matter such as wear dust originating from gears (such as iron dust) than oil used to exclusively lubricate rolling bearings 10.

Thus, if oil used to lubricate the power transmission mechanism T enters the rolling bearings 10 as it is, foreign objects enter the rolling bearings 10 together with the oil. Foreign objects in oil will not do much harm to the power transmission mechanism T if their amount is within a permissible level. But foreign objects in the rolling bearings 10 could get wedged e.g. between raceways and rolling surfaces, thus causing flaking, scratches, impressions and other damage on raceways and rolling surfaces. This reduces durability of the rolling bearings 10.

SUMMARY OF THE INVENTION

A first object of the present invention is to keep long-term sealability of a seal ring carrying a filter and mounted on a rolling bearing. A second object of the invention is to provide a seal ring of this type which maintains its ability to capture foreign matter even when the seal ring is thermally expanded. A third object of the invention is to prevent entry of foreign matter into rolling bearings in a travel unit which includes, besides the rolling bearings, a power transmission mechanism such as a transmission or a speed reducer, in which oil used to lubricate the power transmission mechanism is also used to lubricate the rolling bearings.

In order to achieve the first object, the present invention provides a rolling bearing comprising an outer race, an inner race, rolling elements mounted between the outer race and the inner race, a seal ring covering at least an opening of a bearing space defined between the outer race and the inner race at one end of the bearing space, wherein the seal ring is formed with an oil passage hole, a filter covering the oil passage hole and configured to catch foreign objects contained in lubricating oil, wherein the seal ring is in engagement with one of the outer race and the inner race, and an annular member fixed to the seal ring and made of a material softer than the material forming the seal ring, wherein the annular member forms a lip portion which faces the other of the outer race and the inner race with a gap left therebetween, or abuts the other of the outer race and the inner race.

That is, to the seal ring, which is in engagement with one of the inner and outer races, the annular member, which is made of a softer material than the seal ring is fixed such that the annular member forms a lip portion which faces the other of the outer race and the inner race with a gap left therebetween, or abuts the other of the outer race and the inner race.

With this arrangement, since the seal ring, which is fixed to one of the bearing races, is harder than the annular member, which forms the lip portion, the seal ring is less likely to be deformed under external force. Thus, the filter can be rigidly fixed to the seal ring, which is made of a less deformable material. It is possible to replace only the annular member, which forms the soft lip portion and which is more likely to be damaged. This prolongs the lifespan of the seal member using the seal ring and thus the bearing.

Since the annular member, which forms the lip portion, is a separate member from the seal ring, which is fixed to one of the bearing races, it is possible to adjust the position of the annular member relative to the seal ring with respect to the width direction of the bearing. This in turn makes it possible to easily adjust the interference of the lip of the seal ring. For example, it is possible to readjust the interference of the lip when the lip portion becomes worn. Also with this arrangement, it is possible to use the same seal ring and/or annular member in bearings having different widths and different model numbers.

The separate seal ring and annular member may be rotationally fixed to each other by means of an adhesive or an anti-rotation mechanism, to prevent wear of the seal ring and the annular member due to relative slip, thereby keeping sealability for a prolonged period of time.

In this arrangement, the materials of the seal ring and the annular member are not limited provided the latter is softer than the former. For example, the seal ring may be made of a resin or a metal, and the annular member may be made of an elastomer which is softer than the resin or metal forming the seal ring, such as rubber.

The seal ring may also be made of a glass fiber-reinforced resin, which is a material more rigid than an elastomer element and thus is less likely to be deformed under external force. Thus, this material ensures high sealability. In any of the arrangements, the seal ring is fixed to one of the inner and outer races.

In any of the above arrangements, the material of the filter is not limited. For example, the filter may be a network member made of a resin or a metal.

In order to achieve the second object, the present invention provides a rolling bearing comprising an outer race, an inner race, rolling elements mounted between the outer race and the inner race, a seal ring covering at least an opening of a bearing space defined between the outer race and the inner race at one end of the bearing space, wherein the seal ring is formed with an oil passage hole, and a filter covering the oil passage hole and configured to catch foreign objects contained in lubricating oil, wherein the seal ring is made of a resin, wherein the filter and the seal ring are formed by insert molding so as to be integral with each other, wherein the filter is made of the same material as the material forming the seal ring, or is made of a material having a linear expansion coefficient which is substantially equal to or larger than the linear expansion coefficient of the material forming the seal ring.

This arrangement may be combined with any of the above arrangements in which the lip portion is a separate member from the seal ring. That is, in any of these arrangements, the filter and the seal ring may be formed by insert molding so as to be integral with each other, and the filter may be made of the same material as the material forming the seal ring, or may be made of a material having a linear expansion coefficient which is substantially equal to or larger than the linear expansion coefficient of the material forming the seal ring.

Since the filter is made of the same material as the material forming the seal ring, or made of a material having a linear expansion coefficient which is substantially equal to or larger than the linear expansion coefficient of the material forming the seal ring, when the seal ring is thermally expanded, the filter is thermally expanded substantially to the same degree as the seal ring, or to a greater degree than the seal ring. This prevents breakage of the mesh of the filter, formation of holes, or any other damage.

The filter and the seal ring may be e.g. made of polyamide resin. If the filter and the seal ring are made of different materials, these materials have to have linear expansion coefficients that are sufficiently close to each other such that no damage is done to the filter when the filter and the seal ring are thermally expanded within an expected temperature range, or the material forming the filter has to have a thermal expansion coefficient larger than that of the seal ring. More preferably, the materials have the same linear expansion coefficient.

In any of these arrangements, the network member forming the filter preferably has a mesh size of 0.3 mm to 0.7 mm, particularly preferably 0.5 mm.

If the mesh size of the filter is too large, large foreign objects can enter the bearing and form large impressions on raceways and rolling surfaces of the bearing that can affect the lifespan of the bearing. Conversely, if the mesh is too small, the mesh could get clogged with foreign objects, thus making it impossible to supply lubricating oil to the bearing.

Thus, an endurance test was conducted to assess the relationship between the size of impressions formed on the raceways and rolling surfaces of the bearing and the lifespan of the bearing. The test results revealed that impressions not larger than a certain size do not affect the lifespan of the bearing. Another experiment was conducted to assess the relationship between the mesh size and the size of impressions formed by foreign objects that have passed through the mesh of the filters.

The mesh size refers to the size of the openings of the mesh. The experiment results revealed that the lifespan of the bearing suddenly decreased when the size of impressions formed on the raceways and rolling surfaces of the bearing exceeds 1 mm. The experiment results also revealed that the mesh size has to be 0.5 mm or smaller in order to prevent passage of foreign objects that could form impressions exceeding 1 mm. Thus, for longer lifespan of the bearing, the mesh size should be 0.5 mm or smaller.

If the filter size is 0.7 mm or smaller, impressions are 1.3 mm or smaller. If impressions are 1.3 mm or smaller, the reduction rate of the lifespan of the bearing can be suppressed to an acceptable level (0.6 of the lifespan of the bearing when the bearing is free of impressions). In order to prevent clogging, the mesh size is preferably 0.3 mm or larger.

In the arrangement in which the filter and the seal ring are formed by insert molding so as to be integral with each other, and the filter is made of the same material as the material forming the seal ring, or made of a material having a linear expansion coefficient which is substantially equal to or larger than the linear expansion coefficient of the material forming the seal ring, any one of various structures and means may be used to bring the seal ring into engagement with one of the bearing races. This arrangement may include the lip portion in the form of the annular member. In any of these arrangements, the seal ring is fixed to one of the inner and outer races.

During operation of the rolling bearing including the seal ring, the seal ring is thermally expanded mainly radially outwardly as e.g. the oil temperature rises. It is required that no gap form between the seal ring and the inner race which allows passage of harmful foreign objects when the ambient temperature rises to the highest point within the expected temperature range, and thus the seal ring is thermally expanded mainly radially outwardly to the maximum.

Thus, if the seal ring is fixed to the inner race, the seal ring may be brought into engagement with the inner race in the following manner.

That is, in a rolling bearing comprising an outer race, an inner race, rolling elements mounted between the outer race and the inner race, a seal ring covering at least an opening of a bearing space defined between the outer race and the inner race at one end of the bearing space, wherein the seal ring is formed with an oil passage hole, and a filter covering the oil passage hole and configured to catch foreign objects contained in lubricating oil, the seal ring comprises at least an engaged portion kept in engagement with the inner race, and a wall portion extending radially outwardly from the engaged portion, and the engaged portion is received in a recess formed in the inner race, thereby keeping the seal ring in engagement with the inner race such that the seal ring is radially movable relative to the inner race when the seal ring is thermally expanded.

The arrangement which allows the seal ring to move relative to the inner race during thermal expansion may be combined with any of the above arrangements. That is, in any of the above arrangements, the seal ring may comprise at least an engaged portion kept in engagement with the inner race, and a wall portion extending radially outwardly from the engaged portion, and the engaged portion may be received in a recess formed in the inner race, thereby keeping the seal ring in engagement with the inner race such that the seal ring is radially movable relative to the inner race when the seal ring is thermally expanded.

With this arrangement, the engaged portion provided at the radially inner portion of the seal ring is engaged in the recess of the inner race such that the engaged portion is kept engaged in the recess when the seal ring is thermally expanded to the maximum within the expected temperature range. Thus no gap forms between the seal ring and the inner race that allows passage of harmful foreign matter when the seal ring is thermally expanded to the maximum.

If the seal ring is fixed to one of the inner and outer races and faces the other of the inner and outer races with a minute gap defined therebetween such that the gap forms a labyrinth seal, oil can ordinarily flow through this minute gap. But since this gap is very small, harmful foreign objects cannot pass through this gap into the rolling bearing. In this arrangement, even if the minute gap decreases or disappears due to thermal expansion of the seal ring, there will be no problem.

In this arrangement, a lip portion may be provided on the radially outer side of a seal ring fixed to the inner race so as to abut the outer race or faces the outer race with a gap left therebetween. The lip portion may be a separate member from the seal ring which is fixed to the seal ring by means of an adhesive or by fitting. By providing the lip portion as a separate member from the seal ring, it is possible to use a relatively less deformable material, such as glass fiber-reinforced resin, as the material for the seal ring, and use a material softer than the seal ring, such as rubber, as the material for the lip portion.

In any of the above arrangements, the seal ring may include a labyrinth seal forming portion extending from the wall portion and facing the outer race with a minute gap left therebetween. If the seal ring is fixed to the inner race through the engaged portion and the recess, the labyrinth seal forming portion is an annular member axially extending from the wall portion with its free end facing an outer end surface with a minute gap left therebetween and its radially outer surface facing a housing retaining the outer race with a minute gap left therebetween. The labyrinth seal forming portion may be integral with the seal ring, or may be a separate member from the seal ring which is fixed to the seal ring by means of an adhesive or by fitting.

If the seal ring is fixed to the inner race, the labyrinth seal forming portion is arranged to face the outer race with a minute gap therebetween. If the seal ring is fixed to the outer race, the labyrinth seal forming portion is arranged to face the inner race with a minute gap therebetween. In this case, a labyrinth seal is defined between the labyrinth seal forming portion of the seal ring, which is fixed to one of the inner and outer races, and the end surface or the radially inner surface of the other of the inner and outer races, or between the labyrinth seal forming portion and the rotary housing retaining the other of the inner and outer races.

For example, the seal ring may be fixed to the inner race, and the labyrinth seal forming portion may be an annular member axially extending from the wall portion of the seal ring, with its free end facing the end surface of the outer race with a minute gap defined therebetween, and its radially outer surface facing the housing retaining the outer race with a minute gap defined therebetween.

With this arrangement, the cylindrical labyrinth seal forming portion is arranged such that its radially outer surface faces the rotary housing retaining the outer race with a minute gap defined therebetween, and its free end faces the end surface of the outer race with a minute gap defined therebetween. Thus, when the seal ring is thermally expanded, the seal ring tends to expand in a direction to decrease the minute gap between the seal ring and the rotary housing (radially outward direction). This minimizes the possibility of separation of the seal ring due to thermal expansion. The annular member constituting the labyrinth seal forming portion may be a cylindrical member, or a member having a tapered inner or outer surface.

In any of these arrangements, if the engaged portion is engaged in the recess formed in the inner race to prevent passage of harmful foreign objects through seal ring and the inner race into the bearing, this recess may be formed in the end surface or the radially outer surface of the inner race.

The recess formed in the inner race may be a circumferentially extending seal groove.

Specifically, the engaged portion may be at least one projection provided at a radially inner portion of the wall portion, and the recess may be at least one circumferentially extending seal groove formed in the inner race, wherein the projection is received in the circumferentially extending seal groove, thereby keeping the seal ring in engagement with the inner race such that the seal ring is radially movable relative to the inner race when the seal ring is thermally expanded.

The engaged portion and the recess may each be made up of circumferentially spaced apart portions or a portion extending the entire circumference.

In any of these arrangements, the type of the rolling bearing to which the seal ring is to be mounted is not limited. For example, this seal ring can be mounted to a tapered roller bearing, which includes tapered rollers as rolling elements, a deep groove ball bearing, which includes balls as rolling elements, a cylindrical roller bearing, which includes cylindrical rollers as rolling elements, or a self-aligning roller bearing, which includes spherical rollers.

If the rolling bearing is a tapered roller bearing, the seal groove may open to the radially outer surface of the large-diameter flange of the inner race. If the rolling bearing is a deep groove ball bearing, a cylindrical roller bearing or a self-aligning roller bearing, the seal groove may be open to the radially outer surface of the inner race of the rolling bearing at its end.

In the arrangement in which the engaged portion includes at least one projection, the at least one projection may comprise inner and outer projections, wherein the inner projection is located closer to the rolling elements than is the outer projection, wherein the at least one seal groove comprises an inner seal groove in which the inner projection is received, and an outer seal groove in which the outer projection is received.

With this arrangement, since the engaged portion of the seal ring has the two axially aligned and axially spaced apart projections, the seal ring can be more reliably kept in engagement with the inner race by these projections.

The portion of the inner projection received in the inner seal groove is preferably shorter than the portion of the outer projection received in the outer seal groove.

With this arrangement, when fixing the seal ring in position by pushing the seal ring into the opening of the bearing space, the projection located deeper in the bearing can be more easily fitted in the seal groove by elastically deforming or thermally deforming this projection. Since the outer projection is fitted deeper in the seal groove, this projection prevents disengagement of the seal ring from the inner race even if the seal ring is markedly thermally expanded radially outwardly.

Either one or both of the inner and outer projections may be made up of circumferentially spaced apart portions or a continuous portion extending the entire circumference.

The inner and outer projections may be both made up of circumferentially spaced apart portions such that the circumferentially spaced apart portions of one of the projections are arranged alternate with the circumferentially spaced apart portions of the other projection in the circumferential direction.

With this arrangement, when pushing the seal ring into the opening of the bearing space and fixing it in position, the outer projection is less likely to block the view of the inner projection. This makes it possible to visually confirm that all of the circumferentially spaced portions of the inner projection, which is located deeper in the bearing, are fitted in the inner seal groove.

In the arrangement in which the engaged portion includes the inner and outer projections, at least the outer projection may be arranged so as to be movable axially in the seal groove. With this arrangement, when the seal ring is thermally expanded, the outer projection can smoothly move radially in the seal groove without being restricted by the wall of the seal groove. This prevents radially outward tensile force from acting on the seal ring when the seal ring is thermally expanded, which in turn prevents damage to the filter.

In any of these arrangements, the at least one projection may be formed with an axially extending engaging protrusion, and the at least one seal groove may be formed with an engaging recess in which the engaging protrusion is received, thereby restricting movements of the seal ring in one or both of the radial direction and the circumferential direction.

With this arrangement, it is possible to prevent radial movement of the seal ring beyond a predetermined degree when the seal ring is thermally expanded (especially when the seal ring expanded from a cold state), and simultaneously prevent rotation of the seal ring relative to the inner race.

With this arrangement, the outer seal groove may open to the end surface of the inner race. Since the outer projection is inserted deeper into the seal groove, it may be difficult to fit the outer projection into the seal groove (it may e.g. be bent in the seal groove). But by opening the outer groove to the end surface of the inner race, this problem is avoidable.

In this arrangement, the shaft fixedly fitted in the inner race may be arranged such that its shoulder abuts the end surface of the inner race and thus closes the opening of the seal groove at the end surface of the inner race. With this arrangement, the outer projection is reliably held in position in the seal groove. That is, after fitting the outer projection in the outer seal groove, the opening of the outer seal groove at the end surface of the inner race can be closed by the shoulder of the shaft.

In order to achieve the third object, the present invention provides a travel unit including the rolling bearing with filters of any of the above arrangements, and a power transmission mechanism, in which oil used to lubricate the power transmission mechanism is also used to lubricate the rolling bearing.

Specifically, this travel unit comprises a driving source, a power transmission mechanism for transmitting the rotation of the driving source to a drive wheel, and at least one rolling bearing through which the drive wheel is supported on an axle, wherein the driving source, the power transmission mechanism and the rolling bearing are arranged so as to be coaxial with each other, wherein the lubricating oil for lubricating the power transmission mechanism is used to lubricate the rolling bearing, wherein the rolling bearing comprises the rolling bearing of any of the above arrangements, wherein an oil flow passage is defined on one of two sides of the rolling bearing located closer to the power transmission mechanism through which oil flows from the power transmission mechanism toward the rolling bearing, wherein the oil flow passage is an opening of a bearing space defined between the outer race and the inner race of the rolling bearing at one axial end of the bearing space, wherein the opening is covered by the seal ring, and wherein the filter, which is integral with the seal ring, is configured to catch foreign matter contained in oil that passes through the oil flow passage.

With this arrangement, the harmful foreign matter such as wear dust (e.g. iron dust) contained in lubricating oil flowing out of the power transmission mechanism is captured by the filter such that it never enters the rolling bearing. The filter thus reduces the amount of harmful foreign matter that enters the rolling bearing, thus reducing the possibility of damage to raceways and rolling surfaces of the rolling bearing, such as flaking, scars and impressions. This improves durability and thus the operating lifespan of the rolling bearing.

The power transmission mechanism may be a transmission, a speed reducer, or a speed increasing mechanism. If the power transmission mechanism is a speed reducer, it may be made of a planetary gear mechanism. Such a planetary gear speed reducer is frequently used in construction machines used in harsh use environments, such as dump trucks for use in mines. In such harsh use environments, since harmful foreign matter is more likely to be mixed into oil from e.g. gears of the planetary gear speed reducer, the provision of the filter in the oil flow passage is especially beneficial.

By fixing the filter to the seal ring by insert molding, i.e. by forming the seal ring from synthetic resin or rubber, and integrally fixing the filter to the seal ring by insert molding when forming the seal ring by molding, it is possible to reduce the manufacturing cost of the seal ring with the filter and thus the entire rolling bearing, of the above travel unit, in which oil used to lubricate the power transmission mechanism is also used to lubricate the rolling bearing.

In the arrangement in which this seal ring is used, the at least one rolling bearing may comprise a plurality of rolling bearings juxtaposed to each other in an axial direction, wherein said opening is an opening of a first one of the plurality of rolling bearings located closest to the power transmission mechanism at one of two ends of said first one of the plurality of rolling bearings located closer to the power transmission mechanism.

In this arrangement, in which two or more rolling bearings are axially juxtaposed to each other, the seal ring is provided at the location closest to the power transmission mechanism. Thus, by removing (dismounting) the power transmission mechanism from the travel unit during maintenance of the travel unit, the seal ring is exposed, or becomes relatively easily accessible from outside. The seal ring can thus be easily mounted and dismounted.

This travel unit may further include a rotation sensor mounted on a second one of the plurality of rolling bearings located remotest from the power transmission mechanism at one of two ends of the second one of the plurality of rolling bearings located more remote from the power transmission mechanism.

With this arrangement, by providing the filter on the rolling bearing located closest to the power transmission mechanism, and fixing the rotation sensor on the rolling bearing located remotest from the power transmission mechanism at its end remote from the power transmission mechanism, it is possible to reduce the amount of harmful foreign matter that enters every one of the rolling bearings. Also, it is possible to reduce the amount of harmful foreign matter that enters the detecting portion of the rotation sensor. Since foreign matter is less likely to be adhered to the detecting portion of the rotation sensor, the sensor reliably maintains its sensing ability.

In this arrangement, in which the seal ring and the rotation sensor are used, if the outer race of each rolling bearing is rotated and its inner race is stationary, the outer races of the roller beatings located closest to and remotest from the power transmission mechanism, respectively, may be identical in shape and structure with one of these outer races formed with a seal groove in which the seal ring is fixedly engaged, and the other being formed with a circumferential groove in which the encoder of the rotation sensor is fixedly engaged. The seal groove and the circumferential groove may be formed by cutting or grinding.

With this arrangement, since the outer races of at least two juxtaposed rolling bearings are of the same shape and structure, the rolling bearings can be manufactured at a low cost. In controlling preload, the bearings races of the plurality of juxtaposed rolling bearings are preferably identical in shape and dimensions at least at their portions brought into contact with rolling elements.

If the seal groove and the circumferential groove are identical in shape, the outer races of the juxtaposed rolling bearings can be made completely identical in shape.

In any of these arrangements, the type of the at least one rolling bearing is not limited. For example, the bearing may be a tapered roller bearing, which includes tapered rollers as rolling elements, a deep groove ball bearing, which includes balls as rolling elements, or a cylindrical roller bearing, which includes cylindrical rollers as rolling elements.

If a plurality of juxtaposed rolling bearings are used too, they may be tapered roller bearings, deep groove ball bearings, cylindrical roller bearings or self-aligning roller bearings.

If juxtaposed tapered roller bearings are used, an axial preload may be applied to the bearings with the small-diameter end surfaces of the tapered rollers of the respective bearing facing each other.

With this arrangement, the seal groove and the circumferential groove may be formed on the inner peripheries of the respective outer races at their respective large-diameter ends.

If the seal ring or the encoder of the rotation sensor is fixed to the outer race, the outer race of a tapered roller bearing, the outer race is preferably provided with a large-diameter end portion extending from its area brought into contact with the rolling elements (raceway) and the seal ring or the encoder is mounted to this large-diameter end portion. Since such a large-diameter portion has a large inner diameter, a large space is available for mounting the seal ring or the encoder, so that the seal ring or the encoder can be mounted easily.

In any of the arrangements, the seal ring may be fixed to either of the outer race and the inner race. But especially if the outer race is rotated and the inner race is stationary, the seal ring is preferably fitted in the inner race.

Rolling bearings used in the power trains of various construction machines are arranged, in many cases, such that the outer race is rotated and the inner race is stationary. In such a case, the seal ring is preferably fitted in the stationary inner race.

If a rotation sensor is provided on the rolling bearing, a pulsar ring may be used as the encoder, which is mounted to the outer race, and a magnetic sensor of the back magnet type may be used in the sensor unit mounted to the inner race. Since rolling bearings used in the power trains of various construction machines are relatively large in diameter, the sensor performance stabilizes by using a rotation sensor of the back magnet type.

In the arrangement in which the seal ring is fitted in the rotatable inner race, the engaged portion of the seal ring preferably includes an engaging protrusion in order to prevent separation of the seal ring due to centrifugal force.

According to the present invention, an annular member made of a material softer than the seal ring, which is brought into engagement with one of the inner and outer races, is fixed to the seal ring such that the annular member forms a lip portion which faces the other of the inner and outer races with a gap defined therebetween or abuts the other of the inner and outer races. Thus, since the seal ring, which is fixed to one of the bearing races, is made of a material harder than the annular member, which forms the lip portion, it is less likely to be deformed by external force. The filter is rigidly fixed to the seal ring, which is less likely to be deformed. It is possible to replace only the annular member which forms the lip portion. This extends the lifespan of the seal ring and the rolling bearing using this seal ring.

According to the invention, since the filter and the seal ring are made of the same material, or the filter is made of a material having a linear expansion coefficient equal to or higher than that of the seal ring, when the seal ring is thermally expanded, the filter is also thermally expanded to substantially the same degree as or to a greater degree than the seal ring. This prevents breakage of the mesh of the filter or formation of holes in the mesh. Thus, even when the seal ring is thermally expanded, the filter can reliably catch foreign matter.

Since the engaged portion of the seal ring is always engaged in the recess of the inner race in a temperature range expected during the operation of the bearing, no gap through which harmful foreign objects can pass forms between the seal ring and the inner race even when the seal ring is thermally expanded.

In this regard too, the seal ring can reliably capture foreign matter even after the seal ring has been thermally expanded.

In the travel unit in which oil used to lubricate the power transmission mechanism, such as a transmission or a speed reducer, is used to lubricate the rolling bearing, the filter captures harmful foreign objects contained in oil flowing out of the power transmission mechanism, thus preventing entry of such foreign objects into the rolling bearing. This in turn prevents damage to raceways and rolling surfaces of the rolling bearing, such as flaking, scars or impressions, thus increasing the durability and operating lifespan of the rolling bearing.

BRIEF DESCRIPTION OF THE DRAWINGS

FIG. 1 is a partial enlarged sectional view of an embodiment of the present invention.

FIGS. 2(a) and 2(b) are partial enlarged views of FIG. 1.

FIG. 7 is a partial enlarged sectional view of a third embodiment of the present invention.

FIG. 8 is a partial enlarged sectional view of a fourth embodiment of the present invention.

FIG. 12 is an enlarged vertical sectional view of a portion of a travel unit including rolling bearings of the first embodiment.

DETAILED DESCRIPTION OF THE INVENTION

Figure 3A:
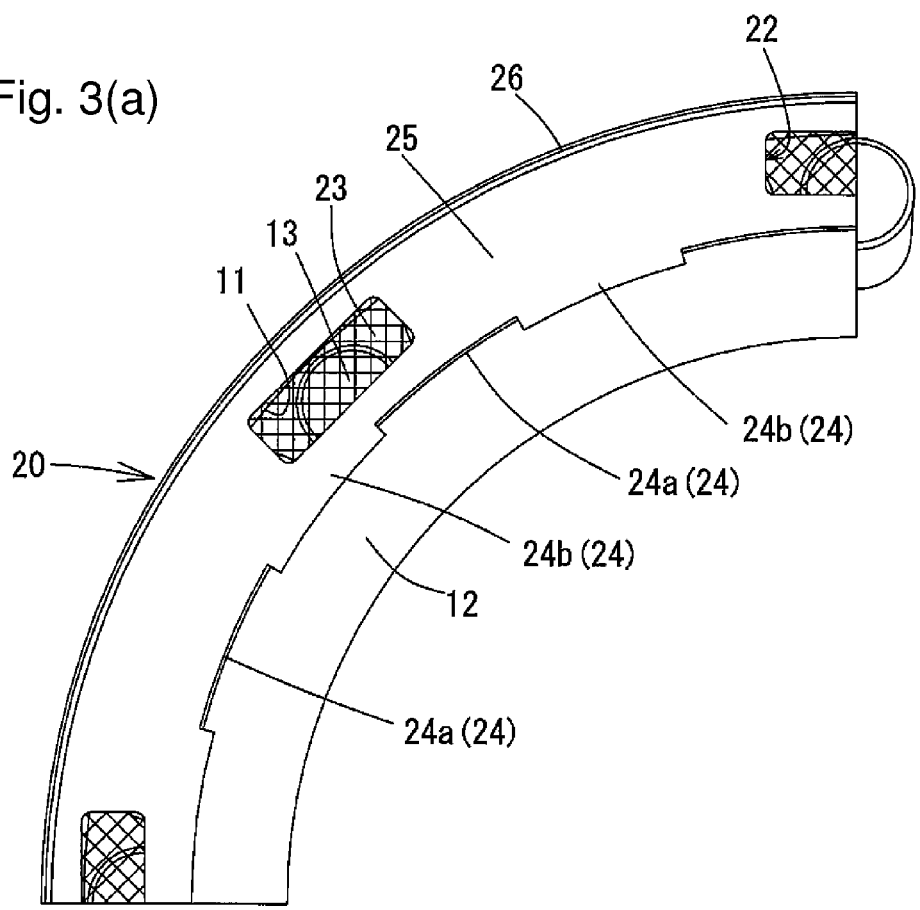
FIGS. 3(a) and 3(b) are a partial enlarged side view and a partial enlarged plan view of a seal ring, respectively.

Now referring to the drawings, the embodiments of the invention are described. FIGS. 1 and 2 show partial enlarged sectional views of the rolling bearing 10 according to the present invention, and FIGS. 3 and 4 show the details of a seal ring 20 of the rolling bearing 10.

Figure 16:
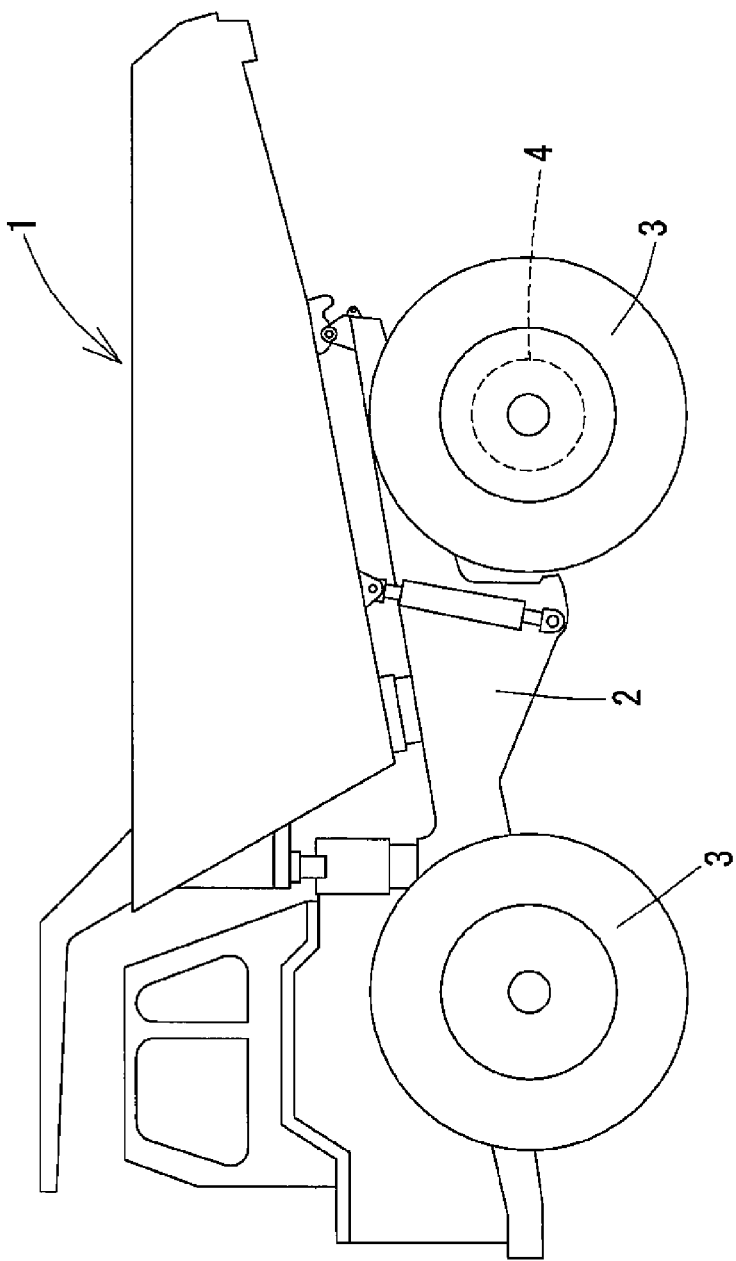
FIG. 16 shows an entire dump truck for use in mines.

The rolling bearing 10 is mounted in the travel unit 4 of a dump truck (construction machine) 1 used in mines, shown in FIG. 16, together with the power transmission mechanism T. This dump truck 1 includes a chassis 2 supporting the deck and the cab, and a plurality of drive wheels (tires) 3. The travel unit 4 drives the drive wheels 3.

Figure 14:
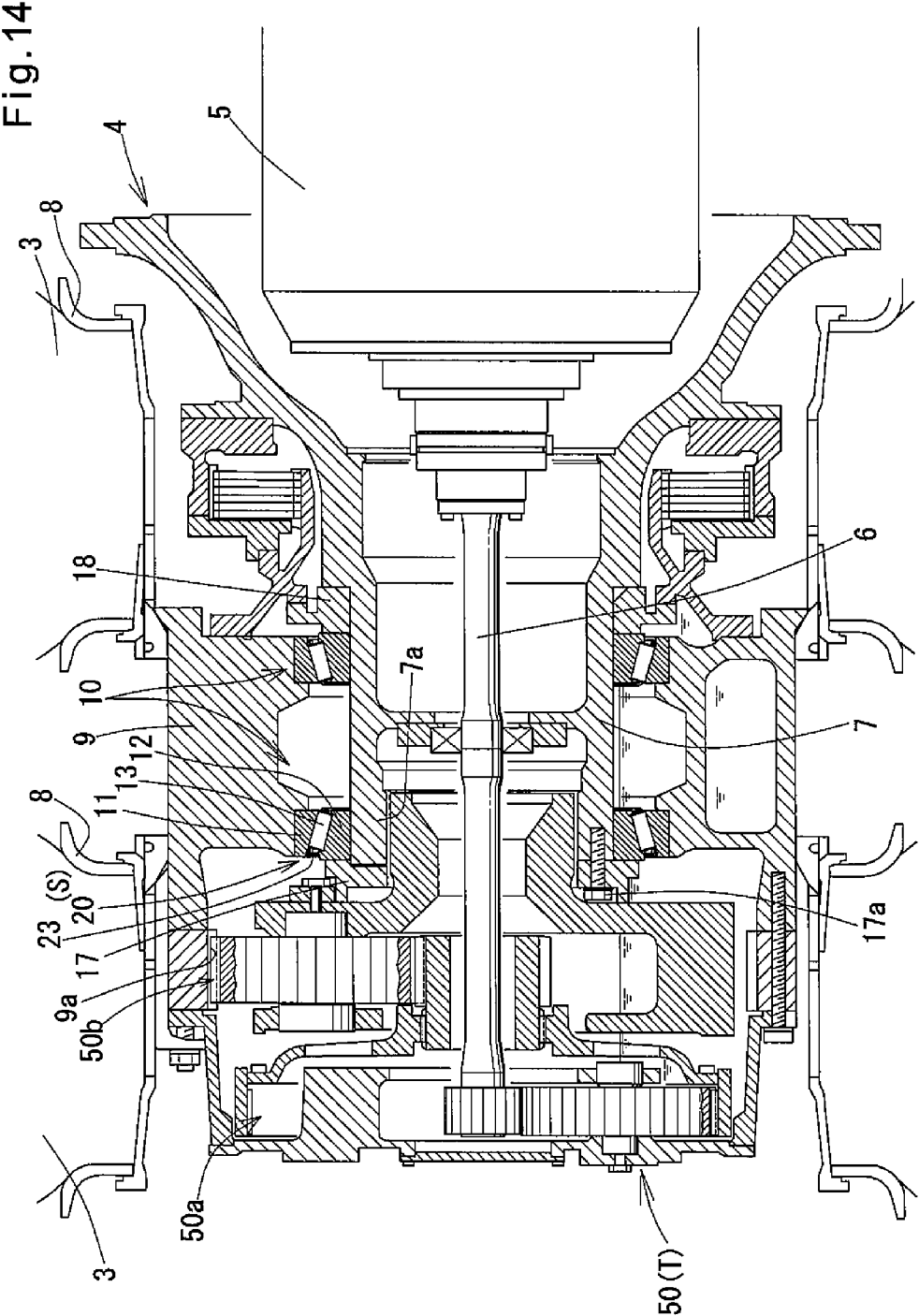
FIG. 14 is a vertical sectional view of a travel unit embodying this invention.
Figure 15:
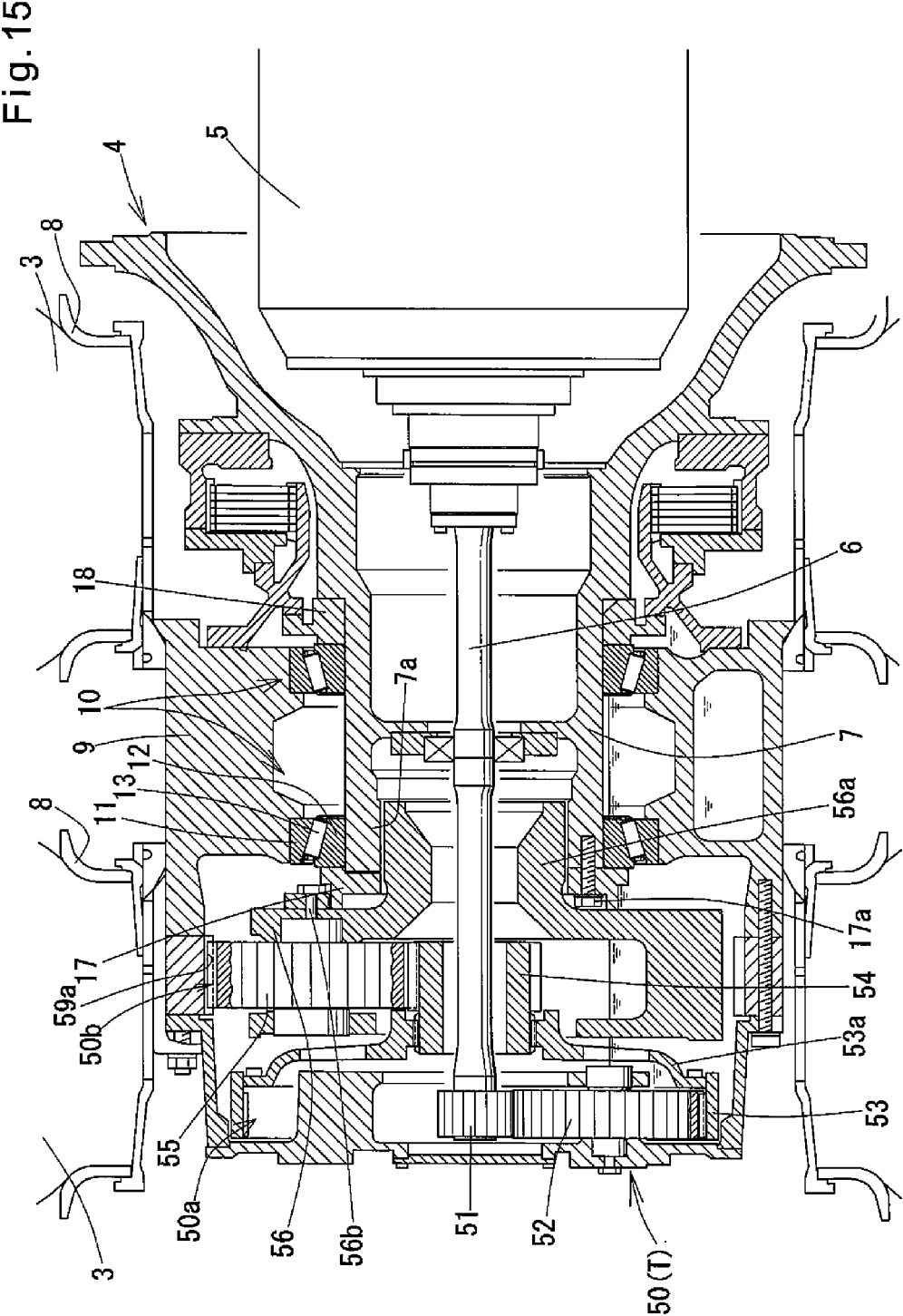
FIG. 15 is a vertical sectional view of a conventional travel unit.

As shown in FIG. 14, the travel unit 4 includes a travel motor 5 as a driving source, and a shaft 6 connected to the rotary shaft of the travel motor 5. The power transmission mechanism T, which is a speed reducer, is mounted around the shaft 6 at its distal end.

A spindle 7, which is a stationary axle, is mounted around the shaft 6. A wheel body 9 is mounted around the spindle through two of the rolling bearings 10. The rotation of the wheel body 9 is transmitted to the drive wheel 3 through a rim 8.

The speed reducer of this travel unit 4 is made up of two planetary gear mechanisms 50, i.e. a first planetary gear mechanism 50a and a second planetary gear mechanism 50b. The rotation of the shaft 6 is reduced by the two planetary gear mechanisms 50a and 50b and transmitted to the wheel body 9. But the speed reducer may be made up of a different planetary gear mechanism or mechanisms, or may be one other than a planetary gear mechanism or mechanisms.

In this travel unit 4, the two rolling bearings 10 are tapered roller bearings arranged parallel to each other between the spindle 7 and the wheel body 9. FIG. 12 is an enlarged vertical sectional view of the portion of the travel unit 4 where there are these rolling bearings 10.

The drive wheel 3 is supported by the spindle through the parallel-arranged tapered roller bearings. In this type of construction machines, tapered roller bearings are frequently used as rolling bearings 10, because tapered roller bearings can support larger radial loads.

As shown in FIG. 12, the rolling bearings 10 each include an outer race 11 having a raceway 11a, an inner race 12 having a raceway 12a, rolling elements 13 or tapered rollers disposed between the raceways 11a and 12a. The rolling elements 13 are retained in position in the circumferential direction by a retainer 14.

The rolling bearings 10 are arranged parallel to each other such that their small-diameter ends face each other. Thus, the rolling bearings 10 are each arranged such that the distance between the raceways 11a and 12a of the outer and inner races 11 and 12 decreases toward the other rolling bearing 10.

A preload is applied to the rolling elements 13 by pressing the inner race 12 of each rolling bearing toward the other rolling bearing, relative to the outer race 11. For this purpose, a bearing presser member 17 shown in FIG. 14 is pressed against the spindle 7 by tightening bolts 17a, thereby axially pressing the respective inner races 12 toward each other by the bearing presser member 17 and another opposite bearing presser member 18, respectively.

The power transmission mechanism T and the rolling bearings 10 are lubricated by common lubricating oil. That is, the power transmission mechanism T and the rolling bearings 10 have their at least lower portions submerged in oil stored in the casing of the travel unit 4 to a certain level. The component parts of the power transmission mechanism T and the rolling bearings 10 are thus lubricated.

The inner races 12 are non-rotatable because the inner races 12 are fixed to the non-rotatable axle (spindle 7). The outer races 11 are rotatable together with a rotary housing H which may be integral with, or otherwise rotatable together with, the wheel body 9 of the drive wheel 3.

The space in the casing between the power transmission mechanism T and the rolling bearing 10 located nearer to the power transmission mechanism serves as an oil flow passage through which the oil in the casing, which is used to lubricate both the power transmission mechanism T and the rolling bearings 10, flows therebetween.

In this embodiment, since there are the two rolling bearings 10 arranged parallel to each other in the axial direction, the oil flow passage is defined by the opening of the rolling bearing 10 on the side of the power transmission mechanism T, i.e. one of the openings of the bearing space defined between the outer race 11 and the inner race 12 of this rolling bearing 10 that faces the power transmission mechanism T. FIGS. 1 and 2 show portions of the rolling bearing 10 on the side of the power transmission mechanism T, in which the opening on the left is the opening facing the power transmission mechanism T.

Figure 4A:
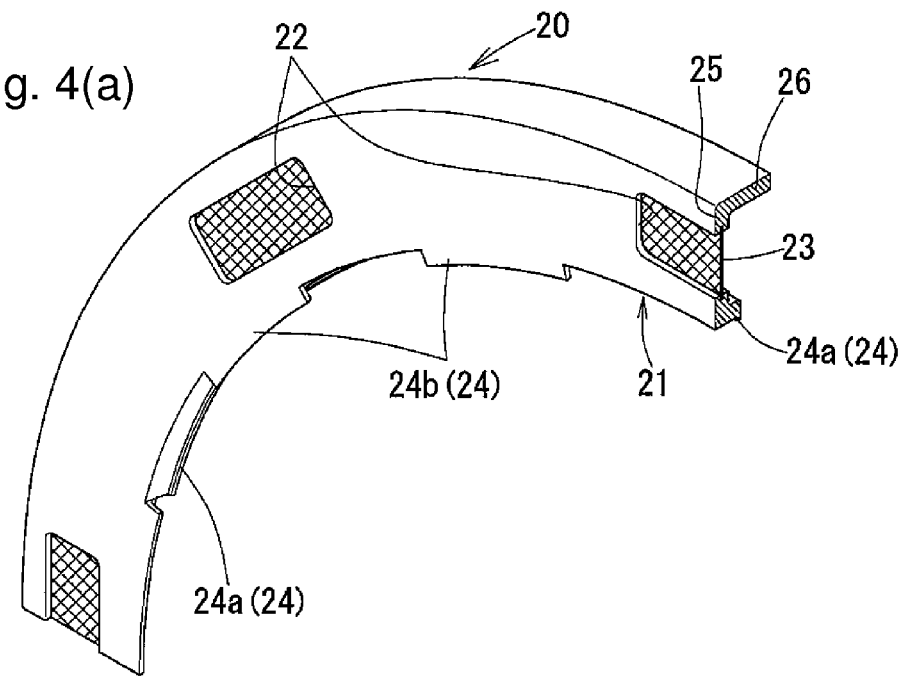
FIGS. 4(a) and 4(b) are perspective views of the seal ring.
Figure 4B:
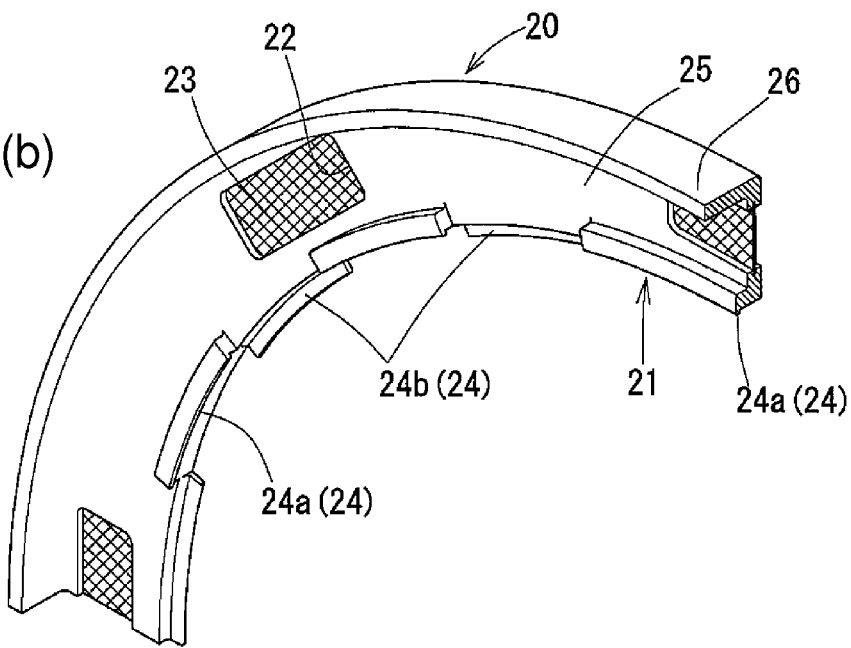

A seal member S is mounted to the rolling bearing 10 on the side of the power transmission mechanism T. As shown in FIGS. 4(a) and 4(b), the seal member S covers the opening of the bearing space of the rolling bearing 10 on the side of the power transmission mechanism T that faces the power transmission mechanism T.

If necessary, another similar seal member S may be mounted to the rolling bearing 10 remote from the power transmission mechanism T to cover its opening remote from the power transmission mechanism T.

As shown in FIG. 1, the seal member S includes a seal ring 20 (seal ring body) having an L-shaped section and including an engaged portion 21 brought into engagement with the inner race 12, a wall portion 25 extending radially outwardly from the engaged portion 21, and a labyrinth seal forming portion 26 extending from the wall portion 25.

The seal ring 20 is made of a resin, and has filters 23 integrally formed by insert-molding of the same resin forming the seal ring 20 to cover oil passage holes 22 formed in the wall portion 25 of the seal ring 20 (i.e., the filters 23 and the seal ring 20 together constitute an insert-molded unit).

The filters 23 are formed substantially at the center of the respective oil passage holes 22 with respect to the length direction of the holes 22 (thickness direction of the body of the seal ring 20) with their peripheral edges embedded in the resin forming the walls of the oil passage holes 22 of the body of the seal ring 20.

Since the filters 23 and the seal ring 20 are made of the same resin, the filters 23 and the seal ring 20 have the same thermal expansion rate. Thus, when the seal ring 20 is thermally expanded due to a rise in temperature of lubricating oil in the rolling bearing 10, the filters 23 are expanded to the same degree as the seal ring 20. This prevents breakage of the mesh of the filters 23 or formation of holes in the filters.

The filters 23 and the seal ring 20 are made of a polyamide resin in the embodiment, but they may be made of any other resin, such as polyacetal (POM), polycarbonate (PC), polyethylene terephthalate (PET), polybutylene terephthalate (PBT), polyetheretherketone (PEEK), polyphenylene sulfide (PPS), polytetrafluoroethylene (PTFE), polysulfone (PSF), polyethersulfone (PES), polyimide (PI) or polyetherimide (PEI). The filters 23 and the seal ring 20 may also be made of any of these resins reinforced with glass fiber, e.g. glass fiber-reinforced polyamide (PA) 46 or glass fiber-reinforced polyamide (PA) 66.

The content of glass fiber in such glass fiber-reinforced resin is determined to an optimum range taking into consideration the shrinkage rate of the resin and the required strength, e.g. within the range of 15-35%, preferably 25-30%. Generally speaking, the higher the glass fiber content, the smaller the shrinkage rate and thus the easier it is to control dimensions after molding. On the other hand, the lower the glass fiber content, the lower the strength of the resin and thus the easier the resin is deformed. When the glass fiber content is 25-30%, an optimum balance is achieved between the shrinkage rate and the strength.

The filters 23 and the seal ring 20 may be made of a resin reinforced with not glass fiber but carbon fiber, polyethylene fiber, aramid fiber, etc.

In the embodiment, the filters 23 and the seal ring 20 are formed by insert-molding of the same material. But the filters 23 may be made of a material different from the material forming the seal ring 20 and having a linear expansion coefficient substantially equal to or larger than the linear expansion coefficient of the material forming the seal ring 20.

In this arrangement too, when the seal ring 20 is thermally expanded, since the filters 23 are expanded to substantially the same degree as or to a greater degree than the seal ring 20, the filter 23 are never stretched excessively, and thus never damaged.

If there is no possibility of damage to the filters when the seal ring 20 is thermally expanded, the filters 23 and the seal ring 20 may be individually made of any desired materials without the need to take into consideration their linear expansion coefficients.

The engaged portion 21 of the seal ring 20, which is provided at the radially inner portion of the seal ring 20, is engaged in circumferentially extending seal grooves (recesses) 30 formed in the inner race 12 such that the seal ring 20 can move radially relative to the inner race 12 when the seal ring 20 is thermally expanded.

Figure 3B:
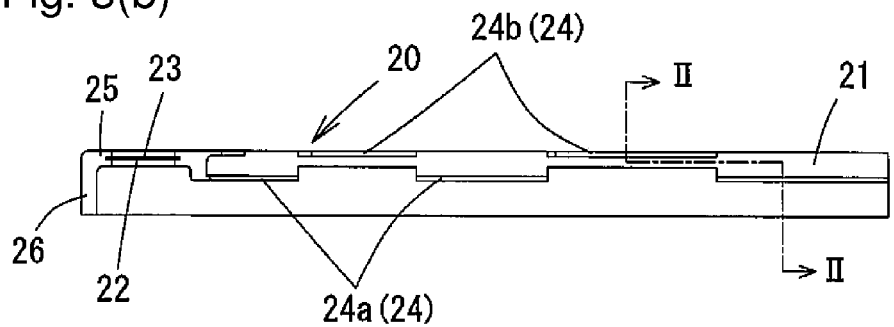

As shown in FIGS. 3(a) and 3(b), the oil passage holes 22 of this embodiment have the shape of rectangular elongated holes as seen from one side of the bearing, and are circumferentially spaced apart from each other. The number and the shape of the oil passage holes 22, as well as the distances therebetween, are not limited. For example, the holes 22 may have a shape other than rectangles as seen from one side of the bearing. For example, the holes 22 may be circular arc-shaped elongated holes as seen from one side of the bearing.

The filters 23, made of resin, may be of a network structure with a mesh size of about 0.1 to 1 mm. In the embodiment, the filters 23 are of a network structure with a mesh size of 0.5 mm. The mesh size of the filters 23 should be adjusted according to the diameters of foreign objects which it is desired to catch with the filters 23. The optimum mesh size range within which the bearing lifespan is maximized will be described later.

The labyrinth seal forming portion 26 is a cylindrical member extending axially inwardly from the radially outer edge of the wall portion 25 such that the distal end of this cylindrical member faces the end surface of the outer race 11 with a minute gap left therebetween. The radially outer surface of the cylindrical member faces the radially inner surface of the housing H, which retains the outer race 11 so as to be rotatable together with the outer race, with a minute gap left between the cylindrical member and the housing H. A labyrinth seal is defined by the minute gaps between the labyrinth seal forming portion 26 and the end surface of the outer race 11 and between the labyrinth seal forming portion 26 and the radially inner surface of the rotatable housing H.

Oil can flow into the rolling bearing 10 through the labyrinth seal. But harmful foreign objects cannot pass therethrough because the gaps forming the labyrinth seal are sufficiently small. In FIG. 1, the minute gaps forming the labyrinth seal are larger than the actual minute gaps so that the minute gaps can be seen clearly.

The labyrinth seal forming portion 26 is not limited to a cylindrical member but may be any other annular member having a central axis. For example, the labyrinth seal forming portion may have a tapered inner or outer surface. For example, this annular member may have a conical surface radially and gradually expanding in one axial direction on the side of the labyrinth seal. With this arrangement, it is more difficult for oil and foreign objects to enter the bearing through the labyrinth seal.

Now the engaged portion 21 and the seal grooves 30 are described in detail. As shown in FIGS. 2(a) to 4(b), the engaged portion 21 of the seal ring 20 includes radially inwardly extending projections 24 at the radially inner portion of the wall portion 25.

The projections 24 include inner projections 24a located nearer to the rolling elements 13 and outer projections 24b located remote from the rolling elements 13. The seal grooves 30 include an inner seal groove 30a in which the inner projections 24a are engaged, and an outer seal groove 30b in which the outer projections 24b are engaged.

With the projections 24 engaged in the seal grooves 30, the seal ring 20 is held in position so as to be radially movable relative to the inner race 12 when the seal ring is thermally expanded.

The seal ring 20 can be reliably kept in engagement with the inner race 12 by the axially spaced apart projections 24a and 24b.

Before the temperature of the oil for lubricating the rolling bearings 10 rises (i.e. in a steady state), the depth h1 of the portions of the inner projections 24a inserted in the inner seal groove 30a is shallower than the depth h2 of the portions of the outer projections 24b inserted in the outer seal groove 30b as shown in FIG. 2(a).

With this arrangement, when pushing the seal ring 20 into the opening of the bearing space and fixing it in position, the inner projections 24a, which are located deeper in the bearing, can be easily fitted in the inner seal groove 30a due to their elastic deformation or thermal deformation when the seal ring is pushed into the bearing space.

Since the depth h2 of the portions of the outer projections 24b inserted in the outer seal groove 30b is relatively deep, even when, as shown in FIG. 2(b), the seal ring 20 is thermally expanded markedly radially outwardly due to a rise in temperature, the outer projections 24b still remain engaged in the outer seal groove 30b. Thus, even in this expanded state, the seal ring 20 can be kept in engagement with the inner race 12, thus preventing entry of harmful foreign objects into the rolling bearing 10.

In particular, the height h2 of the portions of the outer projections 24b inserted in the outer seal groove 30b is determined such that no gap is present between the seal ring 20 and the inner race 12 through which harmful foreign objects can enter the rolling bearing 10 when the rolling bearing 10 is heated to the maximum expected temperature and thus the seal ring 20 is expanded to a maximum (see FIG. 2(b)).

Therefore, within the expected temperature range, the outer projections 24a are always kept engaged in the outer seal groove 30b, preventing formation of a gap between the seal ring and the inner race which allows passage of harmful foreign objects.

In this embodiment, as shown in FIGS. 3(a)-4(b), the inner projections 24a are arranged to alternate with the outer projections 24b in the circumferential direction.

With this arrangement, when pushing the seal ring 20 into the opening of the bearing space and fixing it in position, the outer projections 24b are less likely to block the view of any of the inner projections 24a. This makes it possible to visually confirm that all the inner projections 24a, which are located deeper in the bearing, are fitted in the inner seal groove 30a. In this regard, FIGS. 1-2(b) show sectional views taken along line II-II of FIG. 3(b) to show the positional relationship between the inner and outer projections 24a and 24b as well as their respective heights.

In this embodiment, the inner projections 24a and the outer projections 24b are arranged in the circumferential direction such that the former do not overlap with the latter as viewed from the axial direction. That is, the circumferential ends of the respective inner projections 24a are located at the same circumferential positions as the corresponding circumferential ends of the circumferentially adjacent outer projections 24b.

But instead, the inner projections 24a and the outer projections 24b may be arranged in the circumferential direction such that the former partially overlaps with the latter as viewed from the axial direction.

In this embodiment, as shown in FIG. 2(a), an axial gap w1 is present between the portions of the outer projections 24b inserted in the outer seal groove 30b and an end wall of the outer seal groove 30b. That is, the outer seal groove 30b has an axial width larger than the width of the outer projections 24b by the width of the axial gap w1. The outer projections 24b are thus axially movable in the outer seal groove 30b within the range of the axial gap w1.

Since the outer projections 24b are axially movable in the outer seal groove 30b, when the seal ring 20 is thermally expanded, the outer projections 24b are smoothly movable in the radial direction without being restricted by the inner wall of the outer seal groove 30b. This prevents radially outward tensile force from acting on the seal ring 20 when the seal ring is thermally expanded, which in turn prevents damage to the filters 23.

The outer seal groove 30b opens to the end surface of the inner race 12 as shown in FIG. 2(a). An axle is fixedly fitted in the radially inner surface of the inner race 12. The axle has a shoulder A configured to abut the end surface of the inner race 12 when the axle is fixedly fitted in the inner race. Thus, after fitting the outer projections 24b in the outer seal groove 30b, it is possible to close the opening of the outer seal groove 30b at the end face of the inner race with the shoulder A of the axle.

The opening of the outer seal groove 30b at the end surface of the inner race 12 thus makes it easier to fit the outer projections into the outer seal groove. By closing the opening at the end surface with the shoulder A of the axle, the shoulder A prevents the outer projections 24b from coming out of the outer seal groove 30b.

The operation of the seal ring 20 is now described. While the travel unit 4 is being used, oil is partly splashed from the power transmission mechanism T against the side of the rolling bearing 10 due to rotation of the power transmission mechanism T and the rolling bearing 10.

Since the seal ring 20 is fitted to the opening of the bearing space of the rolling bearing 10 facing the power transmission mechanism T, oil is splashed against the seal ring 20. Oil that has splashed against the seal ring 20 partially collides against the filters 23 of the oil passage holes 22.

Oil that has collided against the filters 23 passes through the mesh of the filters 23, but foreign objects contained in the oil and larger than the mesh size of the filters 23 are caught by the filters 23. The filters 23, which are integral with the seal ring 20, thus catch any harmful foreign objects contained in oil passing through the opening (the above mentioned oil flow passage) at the one axial end of the bearing space of the rolling bearing 10. The oil that has passed through the filters 23 flows into the bearing space and lubricates the rolling bearing 10. This arrangement prevents harmful foreign objects discharged from the power transmission mechanism T from entering the rolling bearing 10.

If the filters 23 are clogged with foreign objects, the entire seal ring 20 can be replaced with a new seal ring 20

This embodiment is directed to a rolling bearing 10 in a travel unit 4 for use in large-sized construction machines. The rolling bearing 10 is used with the outer race 11 as a rotary member and the inner race 12 as a stationary member. Since the seal ring 20 is kept in engagement with the stationary inner race 12, the filters 23 cannot move circumferentially about the axis of the bearing, so that foreign objects caught by the filters 23 are less likely to fly away.

The type of the rolling bearing 10 to which the seal ring 20 is mounted is not limited. For example, this rolling bearing 10 may e.g. be a tapered roller bearing, in which tapered rollers are used as the rolling elements, a deep groove ball bearing, in which balls are used as the rolling elements 13, or a cylindrical roller bearing, in which cylindrical rollers are used as the rolling elements 13.

Figure 5:
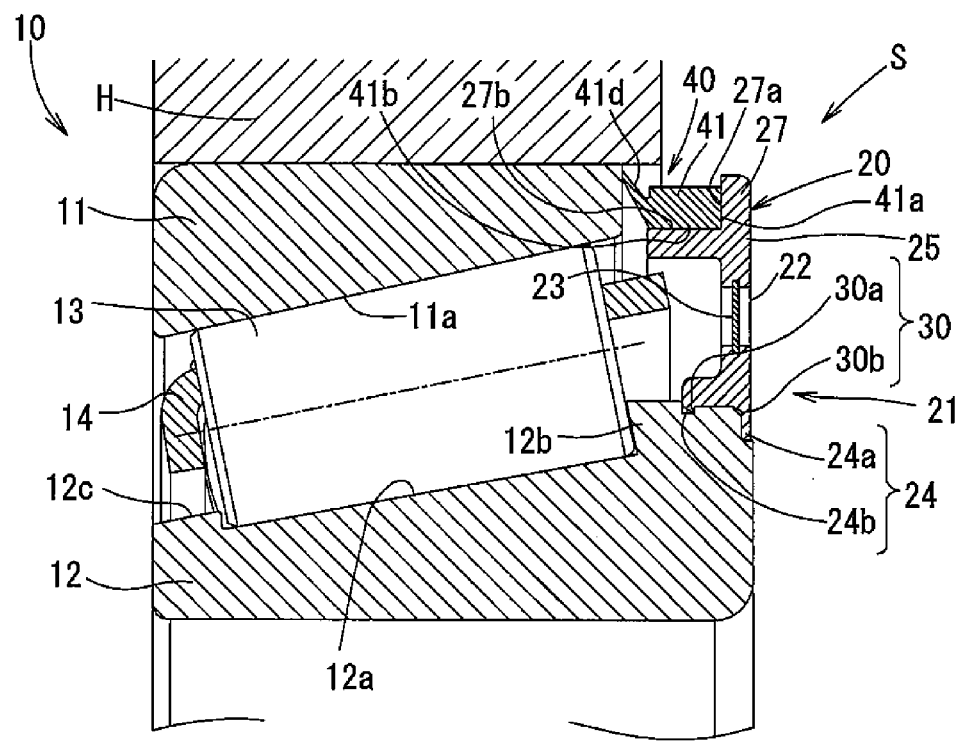
FIG. 5 is a partial enlarged sectional view of a second embodiment of the present invention.

FIG. 5 shows the second embodiment of the present invention. This embodiment includes a lip portion 41 provided at the radially outer portion of the seal ring 20 and in abutment with the outer race 11. The lip portion 41 is an annular rubber member 40 separate from and fixed to the seal ring 20. Otherwise, this embodiment is structurally similar to the first embodiment. Thus, description is made mainly of what differs from the first embodiment.

In this embodiment, as shown in FIG. 5, the seal member S has a seal ring 20 (seal ring body) including an engaged portion 21 kept in engagement with the inner race 12 of the rolling bearing 10, a wall portion 25 extending radially outwardly from the engaged portion 21, and a lip mounting portion 27, provided at the radially outer portion of the wall portion.

As shown in FIG. 5, the annular member 40 is fixed to the lip mounting portion 27 of the seal ring 20. The annular member 40 is made of rubber and is softer than the seal ring 20, which is made of e.g. polyamide resin. The annular member 40 is fixedly fitted around the lip mounting portion 27, and is closely pressed against the lip mounting portion 27 due to its elasticity. If the annular member 40 is made of a synthetic rubber, the synthetic rubber may be nitrile rubber, acrylic rubber, urethane rubber or fluororubber.

The annular member 40, which is fixed to the lip mounting portion 27, constitutes the lip portion 41, which abuts the outer race 11. The lip portion 41 includes an abutment portion 41d provided at a distal end thereof and configured to abut the outer race 11. Even when seal ring 20 is thermally expanded, the lip portion 41 is kept in abutment with the outer race 11 due to its elasticity.

Since the seal ring 20, which is fixed to the inner race 12, is made of a harder material than the annular member 40, which constitutes the lip portion 41, the seal ring is less likely to be deformed under external force. Thus, the filters 23 can be rigidly fixed to the less deformable seal ring 20. Only the annular member 40, which constitutes the lip portion 41 and which is softer and thus more susceptible to damage, is replaceable. This increases the lifespan of the seal member S as well as the bearing including the seal member S.

Figure 6:
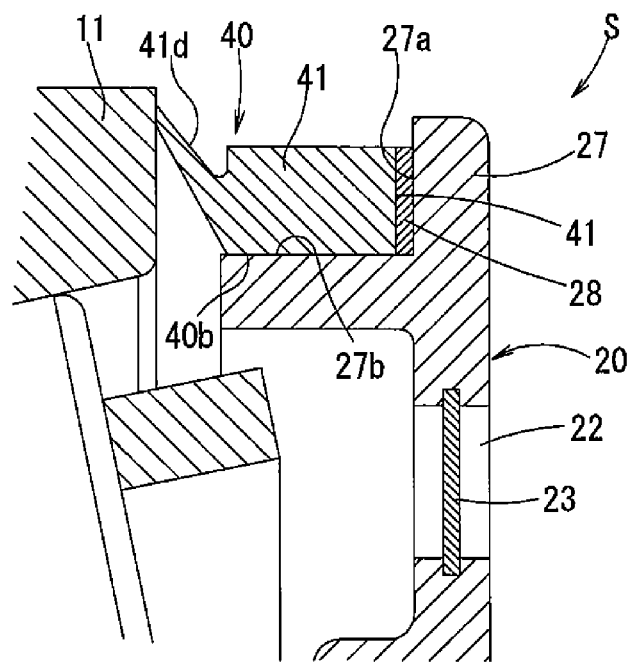
FIG. 6 is a partial enlarged view of FIG. 5 in which a dimension adjusting member is inserted.

Since the annular member 40, which constitutes the lip portion 41, is a separate member from the seal ring 20 fixed to the inner race 12, it is also possible to adjust the position of the annular member 40 in the width direction of the bearing, relative to the seal ring 20. This adjustment is made e.g. by, as shown in FIG. 6, inserting a dimension adjusting member 28 between the axially outer end surface 40a of the annular member 40 and the inner end surface 27a of the lip mounting portion 27. A plurality of such dimension adjusting members 28 in the form of plate-shaped members (shims) having different thicknesses from each other may be prepared so that the dimension of the annular member 40 is easily adjustable.

By adjusting the position of the annular member 40 relative to the seal ring 20, it is possible to easily adjust the interference of the lip portion of the seal member S. This makes it possible to readjust the interference of the lip portion 41 when the lip portion 41 becomes worn, and also makes it possible to use the same seal ring 20 and annular member 40 in different bearings which are different in model number and thus have different widths.

The seal ring 20 and the annular member 40, which are separate members from each other, may be rotationally fixed together by means of an adhesive or by an anti-rotation mechanism, thereby preventing wear of these members due to relative slip therebetween and thus reduced sealability. If the annular member 40 is adhesively fixed to the seal ring 20, an ordinary adhesive may be used, or they may be fixed together by vulcanization. Preferably, the axially outer end surface of the annular member 40 is adhesively bonded to the inner end surface 27a of the lip mounting portion 27, and further the inner peripheral surface 40b of the annular member 40 is adhesively bonded to the outer peripheral surface 27b of the lip mounting portion 27.

Preferably, the annular member 40 is not only radially adhesively bonded to the seal ring, but is fitted on the seal ring with an interference fit to more reliably prevent slip in the rotational direction. But if an anti-rotation mechanism is used instead of an adhesive, the annular member is replaceable more easily.

FIG. 7 shows the third embodiment, in which the engaged portion 21 of the seal ring 20 and one of the seal grooves 30 of the inner race 12 are provided with an engaging means 29 for restricting radial movement of the seal ring 20.

As shown in FIG. 7, the engaging means 29 includes engaging protrusions 29a provided on the engaged portion 21, and engaging recesses 29b formed in the one of the seal grooves 30.

The engaging protrusions 29a are provided on the respective outer projections 24b of the engaged portion 21 so as to extend axially from their intermediate portions with respect to their protruding directions. The engaging recesses 29b are formed in the inner wall of the outer seal groove 30b so as to be axially recessed from the inner wall such that the engaging protrusions 29a can be inserted in the respective engaging recesses 29b.

The length of the engaging recesses 29b in the radial direction of the bearing is longer by w2 than the length of the engaging protrusions 29a in the radial direction of the bearing. Thus, with the engaging protrusions 29a engaged in the engaging recesses 29b, the engaging protrusions 29a can move in the radial direction of the bearing in the engaging recesses 29b.

In this embodiment, the length of the engaging recesses 29b in the circumferential direction of the bearing is equal to the length of the engaging protrusions 29a in the circumferential direction of the bearing. But the length of the engaging recesses 29b in the circumferential direction may be slightly longer than the circumferential length of the engaging protrusions 29a so that the engaging protrusions 29a can move in the engaging recesses 29b in the circumferential direction of the bearing.

With the engaged portion 21 of the seal ring 20 received in the seal groove 30 of the inner race 12, since the engaging protrusions 29a of the seal ring 20 are received in the respective engaging recesses 29b formed in the seal groove 30, the seal ring 20 is prevented from moving in the radial direction of the bearing by more than a predetermined distance. Its movement in the circumferential direction is also restricted.

Thus, the engaging means prevents radial movement of the seal ring 20 by more than a predetermined distance when the seal ring 20 is thermally expanded (especially if the seal ring 20 is thermally expanded radially outwardly from a cold state), and also prevents rotation of the seal ring 20 relative to the inner race 12.

Since the length of the engaging recesses 29b in the radial direction of the bearing is slightly longer than the length of the engaging protrusions 29a in the radial direction of the bearing, even if the seal ring 20 is hot when the seal ring 20 is mounted on the bearing, the engaging protrusions 29a can be smoothly fitted in the engaging recesses 29b.

FIG. 8 shows the fourth embodiment of the present invention. In this embodiment, the annular member 40 constituting the lip portion 41 has a positioning step 41c on the radially inner surface thereof. The step 41c engages a step 27c formed on the lip mounting portion 27 of the seal ring 20, thus axially positioning the annular member 40 relative to the seal ring 20.

In this embodiment, as well as in the other embodiments, a seal ring fitting portion 31 of the engaged portion 21 between the inner projections 24a and the outer projections 24b is press-fitted, with an interference fit, on a fitting portion 32 of the inner race between the inner seal groove 30a and the outer seal groove 30b. The fitting portion 31 is press-fitted on the fitting portion 32 with a predetermined interference fit by fitting the resin seal ring 20 onto the inner race 12 after thermally expanding the seal ring 20. Since the seal ring 20 is fitted with an interference fit, its sealability improves.

Figure 9:
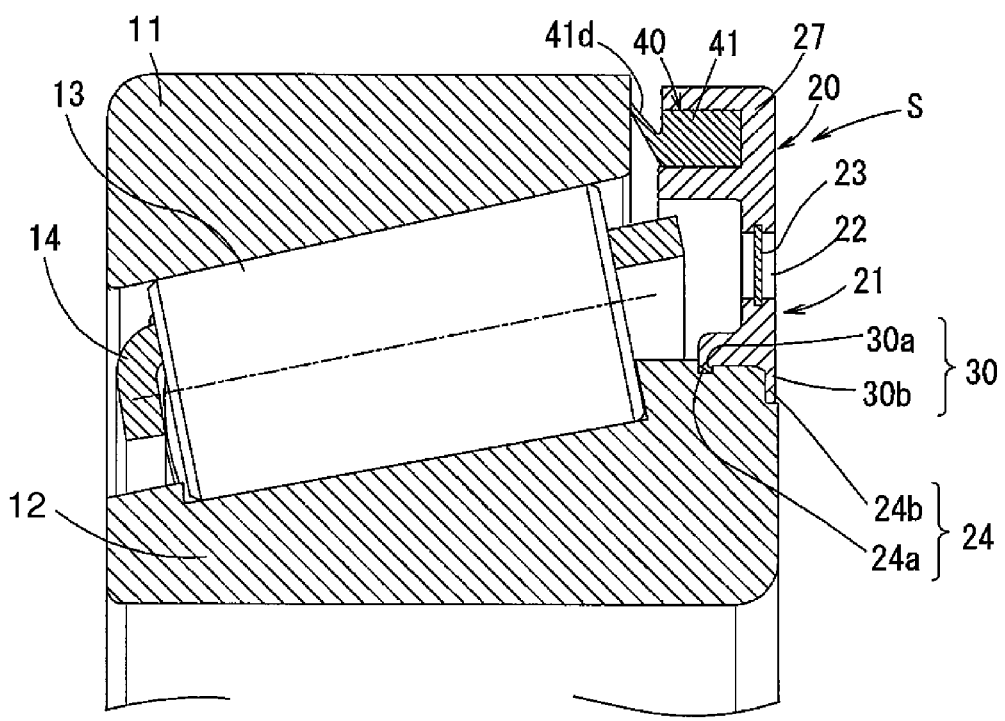
FIG. 9 is a partial enlarged sectional view of a fifth embodiment of the present invention.

FIG. 9 shows the fifth embodiment of the invention. In this embodiment, the lip-mounting portion 27 of the seal ring 20 has a section of a Japanese character "コ".

Since the lip mounting portion 27 has a "コ" shaped section, the seal ring 20 can protect the annular member 40 from external force applied to the seal ring 20. Since the lip mounting portion 27 has a "コ" shaped section, if an adhesive or a filler is used to fix the annular member 40 in position, the adhesive or filler also serves to prevent leakage.

In any of the embodiments, the filters 23 may be made of synthetic resin such as polyamide, or may be made of a metal such as stainless steel. If the filters 23 are made of a synthetic resin, they are lightweight and resistant to rust. If the filters 23 are made of a metal, they are resistant to hard foreign matter such as metal and thus more durable.

Figure 10A:
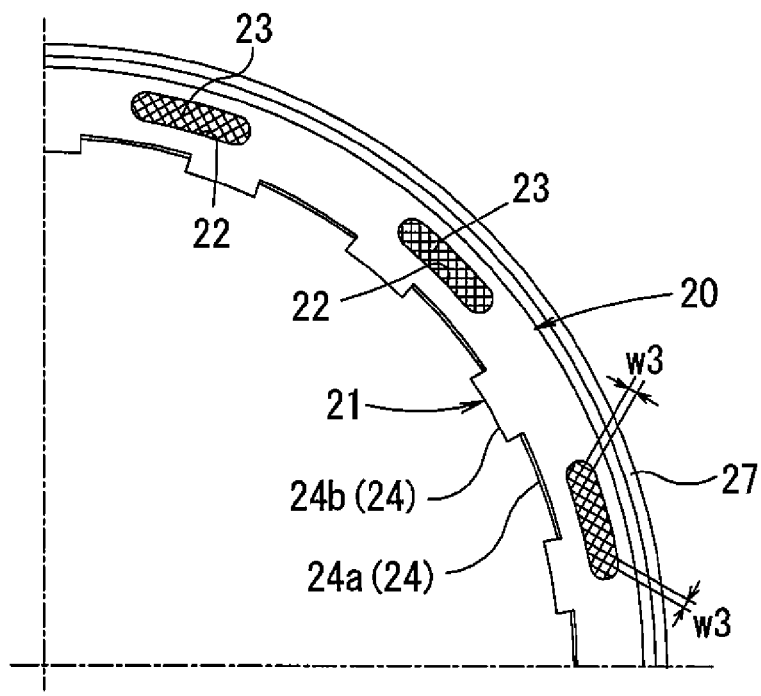
FIGS. 10(a) and 10(b) show the mesh size of filters.
Figure 10B:
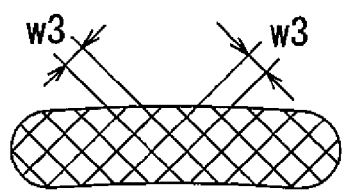

In any of these embodiments, the network member forming the filters 23 has preferably a mesh size of 0.3 to 0.7 mm, more preferably 0.5 mm. The mesh size herein used refers to the size of the openings of the network structure, and is shown by dimension w3 in FIGS. 10(a) and 10(b).

If this mesh size is too large, large foreign objects can pass through the filters 23 into the bearing. Such large foreign objects could form such large impressions on the raceways and the rolling surfaces of the bearing that could affect the lifespan of the bearing. Conversely, if the mesh size is too small, the mesh may be clogged with foreign matter, thus making it impossible to supply lubricating oil into the bearing.

An endurance test (experiment) was conducted to assess the relationship between the size of impressions formed on the raceways and rolling surfaces of the bearing and the lifespan of the bearing. The test results revealed that impressions not larger than a certain size do not affect the lifespan of the bearing. Another experiment was conducted to assess the relationship between the mesh size and the size of impressions formed by foreign objects that have passed through the mesh of the filters.

Figure 11A:
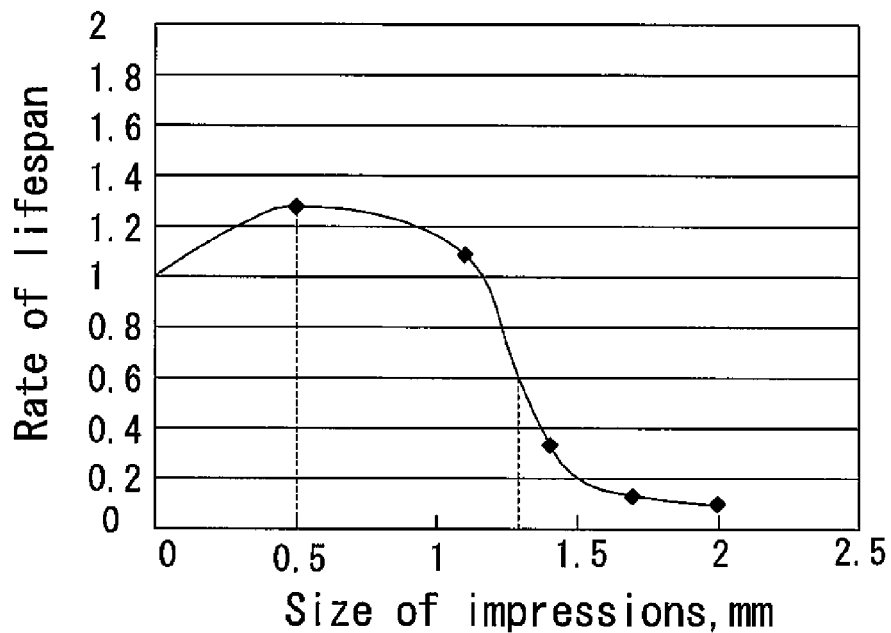
FIG. 11(a) is a graph showing the relationship between the size of impressions and the rate at which the bearing lifespan decreases.
Figure 11B:
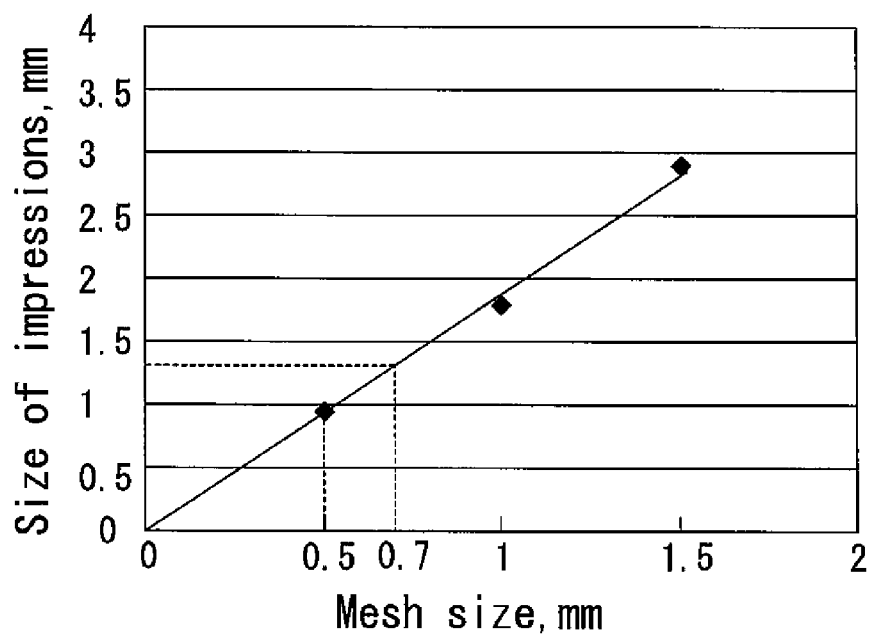
FIG. 11(b) is a graph showing the relationship between the mesh size and the size of impressions.

FIGS. 11(a) and 11(b) show the results of the respective experiments. In particular, FIG. 11(a) shows the relationship between the size of impressions formed on the raceways and the rolling surfaces of the bearing and the rate at which the lifespan of the bearing has decreased due to the formation of the impressions. FIG. 11(b) shows the relationship between the mesh size and the size of impressions formed by foreign objects that have passed through the mesh of the filters.

In the experiments, as the rolling bearing, a tapered roller bearing was used having the main dimensions (inner diameter, outer diameter and width) of 30 mm×62 mm×17.25 mm, and the bearing was operated at the rotational speed (of the shaft) of 2000 min$^{-1}$ with a radial load of 17.65 kN and an axial load of 1.47 kN.

The experiment results revealed that the lifespan of the bearing suddenly decreased when the size of impressions formed on the raceways and rolling surfaces of the bearing exceeds 1 mm. The experiment results also revealed that the mesh size has to be 0.5 mm or smaller in order to prevent passage of foreign objects that could form impressions exceeding 1 mm. Thus, for longer lifespan of the bearing, the mesh size should be 0.5 mm or smaller. If the filter size is 0.7 mm or smaller, impressions are 1.3 mm or smaller. If impressions are 1.3 mm or smaller, the reduction rate of the lifespan of the bearing can be suppressed to an acceptable level (0.6 of the lifespan of the bearing when the bearing is free of impressions). In order to prevent clogging, the mesh size is preferably 0.3 mm or larger.

Figure 13:
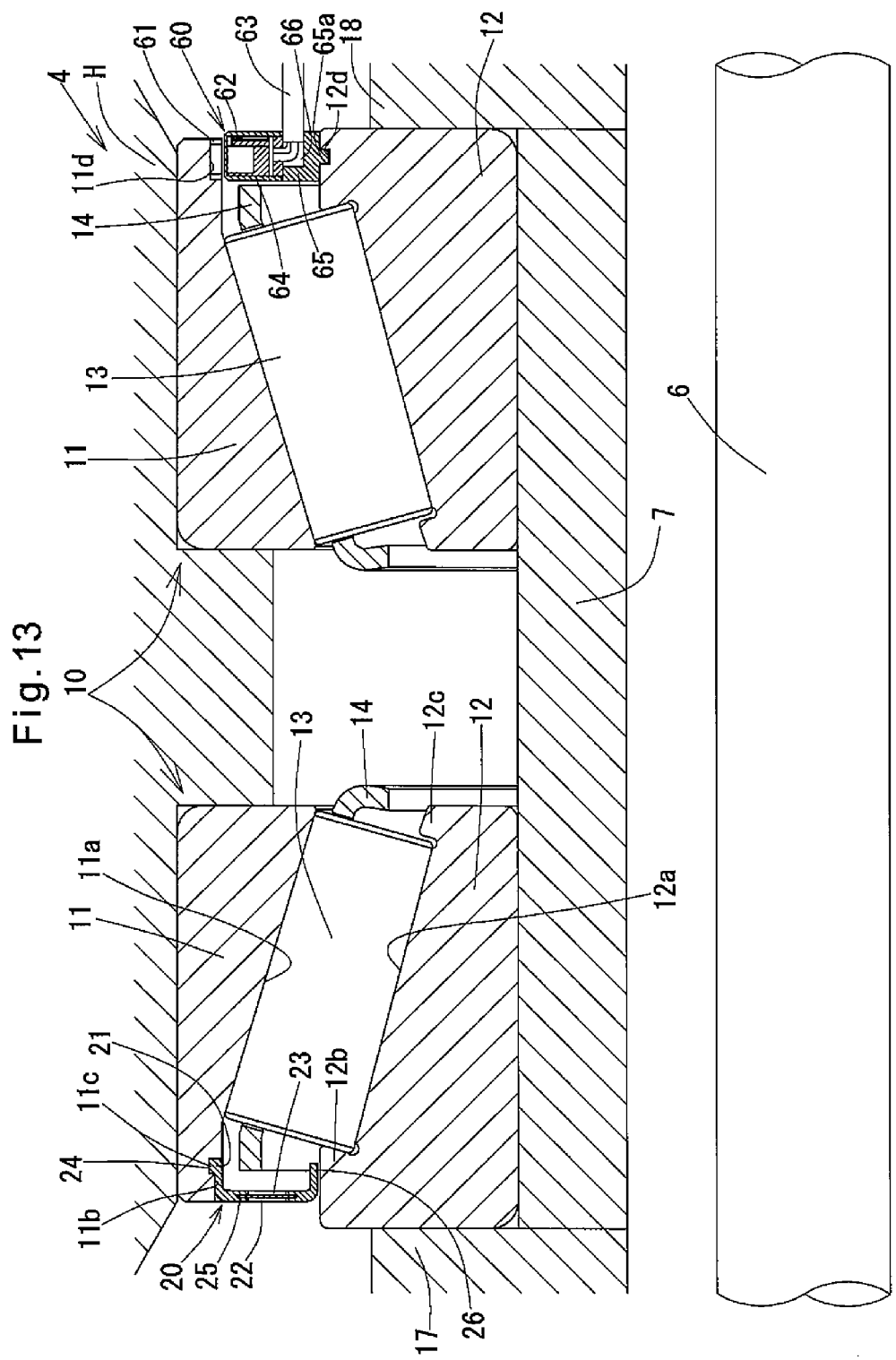
FIG. 13 is an enlarged vertical sectional view of a portion of a travel unit including rolling bearings of a sixth embodiment according to the present invention.

FIG. 13 shows the sixth embodiment of the invention. FIG. 13 is an enlarged vertical sectional view of a portion of a travel unit 4 embodying the present invention. This travel unit 4 is also used as a drive train on a dump truck 1 for use in mines (construction machine). Except the portion shown in FIG. 13, this embodiment is substantially identical to the structure shown in FIG. 14 and other figures. Thus description of this embodiment is made mainly of what differs from the other embodiments, and some of the features that have already been described are not described here.

The travel unit 4 includes, as shown in FIG. 14, which is directed to the other embodiments, a travel motor as a driving source 5, a power transmission mechanism T through which the rotation of the driving source 5 is transmitted to the drive wheel 3, and two rolling bearings 10 through which the drive wheel 3 is supported by the axle such that the motor 5, the transmission mechanism T and the rolling bearings 10 are coaxial with each other. The power transmission mechanism T is a speed reducer including a planetary gear mechanism 50 similar to the one of the other embodiments.

The rolling bearings 10 each include an outer race 11 having a raceway 11a, an inner race 12 having a raceway 12a, rolling elements 13 disposed between the raceways 11a and 12a, and a retainer circumferentially retaining the rolling elements 13.

The two rolling bearings 10 of this embodiment are tapered roller bearings (which means that the rolling elements 13 are tapered rollers) which are juxtaposed to each other in the axial direction. The drive wheel 3 is supported on the axle through the tapered roller bearings 10.

The inner race 12 of each bearing 10 is fitted on the axle (spindle 7), which is stationary, and thus is non-rotatable. The outer race 11 is rotationally fixed to the rotary housing H, and thus is rotatable together with the housing H. The rotary housing H is integral with the body 9 of the drive wheel 3, or fixed thereto so as to be rotatable together with the wheel body 9. (The spindle 7 and the wheel body 9 are shown in FIG. 14.)

An oil flow passage is formed on one side of one of the rolling bearings 10 facing the power transmission mechanism T through which oil flows from the power transmission mechanism T into the rolling bearing 10. A seal ring 20 covers the opening of the internal space of the rolling bearing 10 facing the power transmission mechanism T, and thus covers the oil flow passage. This opening is annular in shape extending along the raceways 11a and 12a of the outer and inner races 11 and 12. The seal ring 20, which covers this opening, is also annular in shape.

The seal ring 20 is formed of a synthetic resin, and is mounted between a large-diameter flange 12b of the inner race 12 and the large-diameter end of the radially inner surface of the outer race 11.

In this embodiment, the outer race 11 is rotated and the inner race 12 is kept stationary. The seal ring 20 is fixed by fitting to the rotary outer race 11.

As shown in FIG. 13, the seal ring 20 includes an engaged portion 21 kept in engagement with the outer race 11, a wall portion 25 radially inwardly extending from the engaged portion 21, and a cylindrical labyrinth seal forming portion 26 extending from the wall portion 25 to face the radially outer surface of the inner race 12.

The engaged portion 21 is a cylindrical member fixedly fitted in a seal groove 11b formed in the radially inner surface of the outer race 11 at its large-diameter end.

A circumferentially extending projection 24 is formed on the radially outer surface of the engaged portion 21 and is detachably engaged in a circumferentially extending recess 11c formed in the seal groove 11b. The seal ring 20, which is mounted in the opening of the bearing space, can be dismounted from the bearing by applying an external force to the seal ring 20 in the axially outward direction (toward the power transmission mechanism T) until the projection 24 disengages from the recess 11c.

The radially inner surface of the labyrinth seal forming portion 26 is slightly larger in diameter than the portion of the radially outer surface of the inner race 12 facing the radially inner surface of the labyrinth seal forming portion 26, defining a minute gap therebetween through which oil can pass but harmful foreign matter cannot.

The wall portion 25 of the seal ring 20 is formed with a plurality of oil passage holes 22 extending axially through the wall portion 25. The oil passage holes 22 are, as viewed from one side of the bearing, circular arc-shaped elongated holes circumferentially spaced apart from, and circumferentially aligned with, each other.

Filters 23 cover the respective oil passage holes 22. In this embodiment, the seal ring 20 is made of a resin, and the filters 23 are formed by insert molding of the same kind of resin forming the seal ring 20 so as to be integral with the seal ring 20.

The filters 23 are formed substantially at the center of the respective oil passage holes 22 with respect to the length direction of the holes 22 (thickness direction of the seal ring 20) with their peripheral edges embedded in the resin forming the walls of the oil passage holes 22 of the seal ring 20.

In this embodiment too, since the filters 23 and the seal ring 20 are made of the same kind of resin, the filters 23 and the seal ring 20 have the same thermal expansion rate. Thus, when the seal ring 20 is thermally expanded due to a rise in temperature of lubricating oil in the rolling bearing 10, the filters 23 are expanded to the same degree as the seal ring 20. This prevents breakage of the mesh of the filters 23 or formation of holes in the filters.

In this embodiment too, the filters 23 and the seal ring 20 are made of e.g. polyamide resin. But they may be made of a different resin.

The filters 23 may be fixed to the surface of the wall portion 25 facing the rolling elements 13 by means of e.g. an adhesive. With this arrangement, a space is defined in each oil passage hole 22 on the side of the filter 23 facing the power transmission mechanism T (planetary gear mechanism 50). This space serves as a space in which foreign matter collects.

The filters 23 may be made of a material other than a resin, such as metal or non-woven fabric. The material forming the filters and their mesh size are determined based on the diameter range of foreign matter to be caught by the filters.

The travel unit 4 of this embodiment includes a rotation sensor 60. As shown in FIG. 13, the rotation sensor 60 is mounted on the rolling bearing 10 remote from the power transmission mechanism T at its end remote from the power transmission mechanism T. If the travel unit is mounted on a construction machine, the rotation sensor 60 can be used to obtain information on the rotation of the wheel body 9 so that this information can be used for ABS control or traction control.

The rotation sensor 60 includes a pulsar ring, as an encoder 61, fixed to the rotary bearing race, i.e. the outer race 11, and a sensor case 64 carrying a sensor unit 62 in the form of a magnetic sensor of a back-magnet type and fixed to the stationary bearing race, i.e. the inner race 12.

Since rolling bearings used e.g. in drive trains of various construction machines are relatively large in diameter, by using a rotation sensor 60 of the back-magnet type as described above, the sensor performance stabilizes. But the rotation sensor 60 is not limited to a magnetic sensor of the back-magnet type.

The sensor case 64, in which the sensor unit 62 is mounted, is fixed to a ring member 65 fitted on the radially outer surface of the inner race 12. Thus, the sensor case 64 is fixed to the inner race 12 through the ring member 65.

The ring member 65 is made up of two diametrically opposed semicircular split portions. By connecting the ends of one of the two semicircular portions to the respective ends of the other semicircular portion, the ring member 65 is fixedly press-fitted on the inner race 12.

In this state, a circumferentially extending protrusion 65a formed on the radially inner surface of the ring member 65 is engaged in a circumferentially extending groove 12d formed in the radially outer surface of the inner race 12.

An input/output line 63 connected to a circuit board mounted on the sensor unit 62 extends through the sensor case 64 and a hole 66 formed in the ring member 65 to the outside of the rolling bearing 10.

The encoder 61 is fixedly fitted in a circumferential groove 11d formed in the radially inner surface of the outer race 11 at its large-diameter end.

Since the rotation sensor 60 is provided on the bearing at its position most remote from the power transmission mechanism T, it is possible to minimize the amount of foreign matter that enters the rolling bearings 10 and then reaches the rotation sensor 60. Foreign matter thus least influences the performance of the rotation sensor 60.

If the filters 23 are clogged with foreign matter, it is possible to replace the seal ring 20 with a new one.

As with the other embodiments, the rolling bearings 10 are tapered roller bearings in this embodiment. But the rolling bearings 10 are not limited to tapered roller bearings. For example, they may be deep groove ball bearings, in which balls, as the rolling elements 13, are mounted between an outer race 11 and an inner race 12 and retained by a retainer, or may be cylindrical roller bearings or self-aligning roller bearings, in which cylindrical rollers or spherical rollers, as the rolling elements 13, are mounted between an outer race 11 and an inner race 12 and retained by a retainer. One of the two bearings 10 may be omitted too.

In this embodiment, the seal ring 20 is opposed to the outer race 11 or the inner race 12 with a minute gap left therebetween. But instead, the seal ring 20 may be brought into contact with both the outer race 11 and the inner race 12.

What is claimed is:

1. A rolling bearing comprising:
    an outer race;
    an inner race;
    rolling elements mounted between the outer race and the inner race;
    a seal ring covering at least an opening of a bearing space defined between the outer race and the inner race at one end of the bearing space, wherein the seal ring is formed with an oil passage hole, and wherein the seal ring is formed of resin so as to constitute a resin seal ring;
    a filter covering the oil passage hole and configured to catch foreign objects contained in lubricating oil, wherein the resin seal ring is fixed to the inner race; and
    an annular member fixed to the resin seal ring and made of a material softer than a material forming the resin seal ring;
    wherein the annular member forms a lip portion which faces the outer race with a gap left therebetween, or abuts the outer race;
    wherein the filter and the resin seal ring together constitute an insert-molded unit such that the filter and the resin seal ring are integral with each other and such that peripheral edges of the filter are integrally buried in and retained in the material of the resin seal ring;
    wherein the filter is made of a material having a linear expansion coefficient which is larger than a linear expansion coefficient of the material forming the resin seal ring.

2. The rolling bearing of claim 1, wherein the annular member is made of a rubber.

3. The rolling bearing of claim 1, wherein the filter is made of a resin or a metal.

4. The rolling bearing of claim 1, wherein the filter has a mesh size of 0.3 mm to 0.7 mm.

5. A travel unit comprising a driving source, a power transmission mechanism for transmitting the rotation of the driving source to a drive wheel, and at least one rolling bearing according to claim 3 through which the drive wheel is supported on an axle, wherein the driving source, the power transmission mechanism and the at least one rolling bearing are arranged so as to be coaxial with each other, wherein the lubricating oil for lubricating the power transmission mechanism is used to lubricate the at least one rolling bearing,
    wherein the oil flow hole is defined on one of two sides of the at least one rolling bearing located closer to the power transmission mechanism through which oil flows from the power transmission mechanism toward the at least one rolling bearing, wherein the oil flow passage is the opening of the bearing space defined between the outer race and the inner race of the at least one rolling bearing at one axial end of the bearing space, wherein the opening is covered by the resin seal ring, and wherein the filter, is configured to catch foreign matter contained in the oil that passes through the oil flow passage.

6. The travel unit of claim 5, wherein the power transmission mechanism is a speed reducer including a planetary gear mechanism.

7. The travel unit of claim 5, wherein the at least one rolling bearing comprises a plurality of rolling bearings juxtaposed to each other in an axial direction, wherein said opening is an opening of a first one of the plurality of rolling bearings located closest to the power transmission mechanism at one of two ends of said first one of the plurality of rolling bearings located closer to the power transmission mechanism.

* * * * *